United States Patent
Blanquart et al.

(10) Patent No.: US 9,191,598 B2
(45) Date of Patent: Nov. 17, 2015

(54) FRONT-END PIXEL FIXED PATTERN NOISE CORRECTION IN IMAGING ARRAYS HAVING WIDE DYNAMIC RANGE

(75) Inventors: Laurent Blanquart, Westlake Village, CA (US); Ying Huang, Simi Valley, CA (US); Joey Shah, Cambridge (CA); David Lawrence Standley, Westlake Village, CA (US)

(73) Assignee: AltaSens, Inc., Westlake Village, CA (US)

( * ) Notice: Subject to any disclaimer, the term of this patent is extended or adjusted under 35 U.S.C. 154(b) by 762 days.

(21) Appl. No.: 13/206,175

(22) Filed: Aug. 9, 2011

(65) Prior Publication Data

US 2013/0038760 A1    Feb. 14, 2013

(51) Int. Cl.
*H04N 5/217* (2011.01)
*H04N 5/378* (2011.01)
*H04N 5/365* (2011.01)

(52) U.S. Cl.
CPC ............ *H04N 5/378* (2013.01); *H04N 5/365* (2013.01)

(58) Field of Classification Search
CPC ............................. H04N 5/365; H04N 5/378
USPC ....................................................... 348/241
See application file for complete search history.

(56) References Cited

U.S. PATENT DOCUMENTS

| | | | |
|---|---|---|---|
| 6,493,030 B1 | 12/2002 | Kozlowski et al. | |
| 6,532,040 B1 | 3/2003 | Kozlowski et al. | |
| 6,535,247 B1 | 3/2003 | Kozlowski et al. | |
| 6,587,142 B1 | 7/2003 | Kozlowski et al. | |
| 6,697,111 B1 | 2/2004 | Kozlowski et al. | |
| 6,809,767 B1 | 10/2004 | Kozlowski et al. | |
| 6,965,707 B1 | 11/2005 | Kozlowski | |
| 2005/0068439 A1* | 3/2005 | Kozlowski et al. | 348/308 |
| 2008/0135895 A1 | 6/2008 | Lee et al. | |
| 2009/0231479 A1* | 9/2009 | Zarnowski et al. | 348/302 |
| 2009/0236500 A1* | 9/2009 | Shah et al. | 250/214 C |
| 2010/0320516 A1* | 12/2010 | Fereyre et al. | 257/292 |

OTHER PUBLICATIONS

International Search Report for International Application No. PCT/US 12/49913 Dated Oct. 22, 2012, 19 Pages.
Takayanagi, et al. A 600×600 Pixel, 500 fps CMOS Image Sensor with a 4.4 micron Pinned Photodiode 5-Transistor Global Shutter Pixel, Proc. IEEE International Image Sensor Workshop, Ogunquit, ME, Jun. 2007, pp. 287-290.

* cited by examiner

*Primary Examiner* — Usman Khan
(74) *Attorney, Agent, or Firm* — Amin, Turocy & Watson, LLP

(57) ABSTRACT

Aspects describe front-end pixel fixed pattern noise correction in imaging arrays having wide dynamic range. A photosensor of a first pixel in a first row of an array is reset and a first reset level of the first pixel is measured. The array comprises a plurality of pixels arranged in rows and columns. In response to a result of the first reset level, a reset bus is altered. A feed-forward adjustment of the photosensor of the first pixel is performed to substantially remove fixed-pattern noise. An external readout from the photosensor can occur with substantially all the fixed-pattern noise removed. In some aspects, the adjustment is performed by a switched capacitor block.

20 Claims, 26 Drawing Sheets

US 9,191,598 B2

FRONT-END PIXEL FIXED PATTERN NOISE CORRECTION IN IMAGING ARRAYS HAVING WIDE DYNAMIC RANGE

BACKGROUND

Image sensor arrays are in widespread use in digital cameras, camcorders, and many other products. Complementary metal-oxide-semiconductor (CMOS) is low cost and versatile and, thus, has become the technology of choice for most of these arrays. Within CMOS itself, many types of devices intended for visible imaging applications are in use. Such devices can be tailored to large-format still cameras, standard video cameras, and compact "web cam" units, for example, all with varying degrees of size, cost, and performance.

CMOS imaging devices generally have what is known as an "electronic shutter," which can function as a replacement for a mechanical shutter. An electronic shutter controls the duration of the exposure on an array of pixel sensors, allowing the system to adapt to lighting conditions. Although an electronic shutter increases overhead in the device design, for most applications the electronic shutter can be worth the advantage of avoiding a mechanical shutter.

A "rolling shutter" is one type of electronic shutter. The rolling shutter can be provided while incurring almost no costs and, therefore, is widely used. For the rolling shutter, an array is scanned one row at a time for readout. At each row read-out, the pixels in the row have been integrating photocurrent for a certain period of time, $T_{int}$, because the pixels have been reset by a separate scanning event $T_{int}$ ago. A vertical scanner can control the separate scanning event. A drawback of the rolling shutter is that while the entire array has a uniform $T_{int}$, the actual start time and end time are different. For example, the top rows of the array may be exposed before the bottom rows of the array are exposed. Thus, horizontally moving objects might be distorted. While $T_{int}$ can be made to have a short duration, the start time and end time might be separated by up to an entire frame period in some cases.

To overcome the drawbacks of a rolling shutter, an electronic "global shutter" can be used. For global shutter, all pixels start and stop integration at the same time, which can avoid the motion artifact of the rolling shutter and can approach the performance of a mechanical shutter. However, the global shutter has more overhead at the pixel, circuit, and system levels. While there are many ways of implementing electronic global shutter, in CMOS a common approach is to use a five transistor (5T) pixel, which is a compact type of shutter that can provide acceptable performance.

The above-described deficiencies of today's image sensor arrays are merely intended to provide an overview of some of the problems of conventional arrays, and are not intended to be exhaustive. Other problems with conventional arrays and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

An aspect relates to a system for discrete time and feed forward correction of fixed pattern noise in a pixel array. The system includes a reset component configured to reset a pixel of the pixel array and an analyzer component configured to sample a reset level of the pixel. The system also includes an adjustment component configured to adjust a reset bus in response to the sampled reset level, wherein the adjustment to the reset bus facilitates correction of the fixed pattern noise. Additionally, the system includes a detection component configured to sample a signal level of the pixel for external readout from the pixel array.

According to another aspect is a method that includes resetting for a first time a photosensor of a first pixel in a first row of an array and sampling a first reset level of the first pixel. The method also includes adjusting a reset bus in response to a result of sampling the first reset level and resetting for a second time the photosensor of the first pixel. Further, the method includes reading out externally from the photosensor. The array includes a plurality of pixels arranged in rows and columns.

In accordance with another aspect is a pixel-reset system that includes means for resetting a photosensor of a first pixel in a first row of an array and means for measuring a first reset level of the first pixel. Also included in pixel-reset system is means for altering a reset bus in response to a result of the first reset level and means for performing a feed-forward adjustment of the photosensor of the first pixel to substantially remove fixed-pattern noise. Further, pixel-reset system includes means for reading out externally from the photosensor. The array includes a plurality of pixels arranged in rows and columns.

These and other embodiments are described in more detail below.

BRIEF DESCRIPTION OF THE DRAWINGS

Various non-limiting embodiments are further described with reference to the accompanying drawings in which.

DETAILED DESCRIPTION

Figure 1:
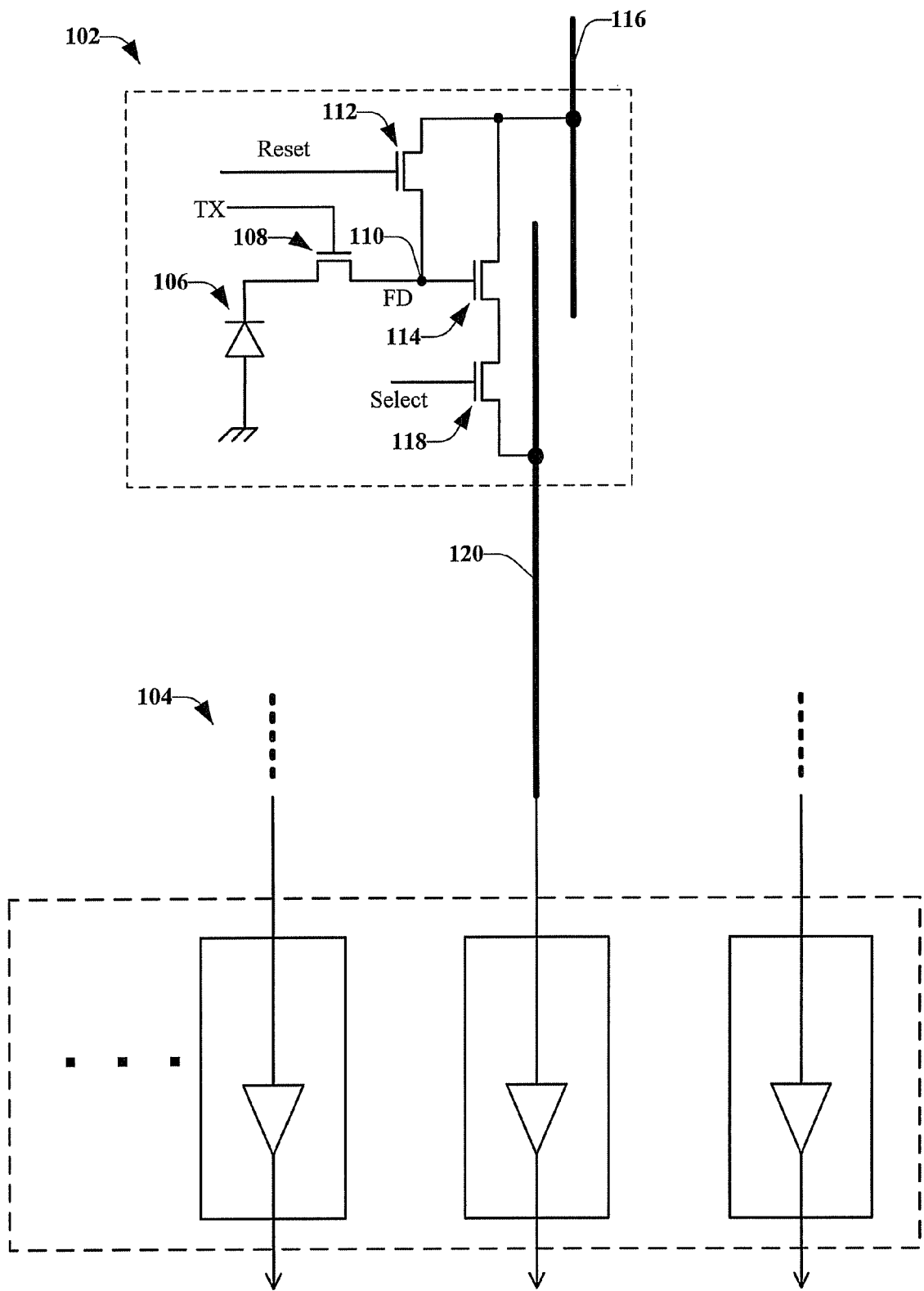
FIG. 1 illustrates a four transistor pixel cell in a two-dimensional array and associated column block or one-dimensional column array for fixed-pattern noise correction.

Conventional complementary metal-oxide-semiconductor (CMOS) imaging device designs can experience pixel fixed-pattern noise (FPN), which is mismatch between the characteristics of the pixels that remains fixed. Mismatches in the offsets of the pixel output voltage levels can be quite high, and these should be corrected in order to obtain a quality picture.

Various systems that utilize feedback to improve pixel performance have been developed; however, such systems have inherent disadvantages. For example, some systems utilize a tapered reset and are intended primarily for three transistor (3T) pixels. Tapered reset is a column-based feedback system that is used to lower the temporal noise of the pixel in progressive scanning mode. Although tapered reset could in principle attenuate FPN if low-offset column circuitry is used, there would still be a significant portion of the charge injection that could not be cancelled.

In modern four transistor (4T) pixels (or pixels with more transistors), which have small floating-node capacitance values, the charge injection mismatch materializes as a large FPN in the corresponding voltage signal. To reduce the temporal noise, the tapered reset process consumes time, as it inherently uses narrowband feedback.

Some systems utilize a global reset version. However, the global reset version requires an additional MOS device in the pixel. Further, the global reset version is not adaptable to reduce the FPN.

Yet in another variation, some systems utilize a capacitor in each pixel to make a charge-to-voltage amplifier with low temporal noise reset. In these systems, however, a portion of the charge injection would still contribute to FPN, unabated.

Further, some approaches reset the pixel and an auto-zero feedback loop subsequently removes the noise, storing a correction voltage in the pixel. This can remove FPN if low-offset column circuitry is used, including the FPN from charge injection. However, this approach requires capacitors in the pixel, which is an area issue (e.g., increases device size).

A scheme referred to as capacitor-less Correlated Double Sampling (CDS) can reset a pixel array with reduced FPN as well as temporal noise. After a row of pixels is reset, a weak current source in each pixel is used to bleed the reset node until it reaches a target, mediated by column circuitry. Again, by using low-offset column circuitry, this can eliminate much of the FPN. However, the process is slow, and the original FPN (before correction) is an overhead in the output range.

Thus, it would be beneficial to provide FPN pixel correction in imaging arrays that utilizes a self-contained feed-forward correction (as part of a discrete-time feedback system). Further, it would be beneficial to provide a system that has its speed limited only by the bandwidth of the pixel readout loop (e.g., the pixel and its read bus).

An aspect relates to a system for discrete time and feed forward correction of fixed pattern noise in a pixel array. The system includes a reset component configured to reset a pixel of the pixel array and an analyzer component configured to sample a reset level of the pixel. The system also includes an adjustment component configured to adjust a reset bus in response to the sampled reset level, wherein the adjustment to the reset bus facilitates correction of the fixed pattern noise. Additionally, the system includes a detection component configured to sample a signal level of the pixel for external readout from the pixel array.

In an implementation, the adjustment component is a switched capacitor block and a read bus is connected to the switched capacitor block and column circuitry for readout. In some implementations, the adjustment component is further configured to adjust a power supply level on the reset bus in response to a result of the sampled reset level. According to some implementations, the reset component is configured to reset the pixel of the pixel array a second time.

In another implementation, the system includes a data readout component configured to readout an image from the pixel array. In some implementations, the adjustment component is further configured to subtract a sampled reference level from the sampled reset level and apply gain at a column level.

According to some implementations, the system includes a first storage media configured to retain the reset level and a second storage media configured to retain the signal level, wherein the retained reset level and the retained signal level includes a fixed-pattern noise map. In an implementation, the pixel array includes a five transistor pixel.

According to another aspect is a method that includes resetting for a first time a photosensor of a first pixel in a first row of an array and sampling a first reset level of the first pixel. The method also includes adjusting a reset bus in response to a result of sampling the first reset level and resetting for a second time the photosensor of the first pixel. Further, the method includes reading out externally from the photosensor. The array includes a plurality of pixels arranged in rows and columns.

In an implementation, resetting the photosensor of the first pixel the second time includes performing a feed-forward adjustment. In another implementation, performing the feed-forward adjustment includes compensating for a pixel offset. In some implementations, resetting the photosensor of the first pixel the second time includes removing fixed-pattern noise.

In accordance with some implementations, the method includes sampling a second reset level after resetting for the second time and retaining the second reset level in a retrievable format. Further to this implementation, the method includes utilizing the retained second reset level for correlated double sampling. Additionally or alternatively, the method includes capturing residual fixed-pattern noise based on the retained second reset level.

In an implementation, the method includes subtracting a first reference level from a second reset level, scanning out of a device, and storing a fixed-pattern noise map. Further to this implementation, the method includes applying gain before the scanning out of the device. Additionally or alternatively, the method includes after integration, sampling a reference level, sampling a signal level, subtracting the reference level from the signal level, scanning a raw signal out of the device, and subtracting the raw signal from the fixed-pattern noise map to obtain a clean signal. Further to this implementation, the method includes applying gain after the subtracting the reference level from the signal level.

In accordance with another aspect is a pixel-reset system that includes means for resetting a photosensor of a first pixel in a first row of an array and means for measuring a first reset level of the first pixel. Also included in pixel-reset system is means for altering a reset bus in response to a result of the first reset level and means for performing a feed-forward adjustment of the photosensor of the first pixel to substantially remove fixed-pattern noise. Further, pixel-reset system includes means for reading out externally from the photosensor. The array includes a plurality of pixels arranged in rows and columns.

Herein, an overview of some of the embodiments for front-end pixel FPN correction in imaging arrays having wide dynamic range has been presented above. As a roadmap for what follows next, various exemplary, non-limiting embodiments and features for front-end pixel FPN correction are described in more detail. Then, some non-limiting implementations and examples are given for additional illustration, followed by a representative operating environment in which such embodiments and/or features can be implemented.

In the various aspects disclosed herein, Negative Channel Field Effect Transistor (NFET) devices can be utilized in the pixels. However, it should be understood that the various aspects can utilize other devices.

In order to fully appreciate the disclosed aspects, FIG. 1 illustrates a four transistor (4T) pixel cell 102 in a two-dimensional (2-D) array and associated column block or 1-D column array 104 for FPN correction. FPN refers to the fixed variation from pixel to pixel. In rolling shutter, FPN correction can be implemented by column circuitry adjacent to the pixel array, as shown in FIG. 1.

The 4T pixel cell 102 can be formed on a semiconductor substrate as part of an imager device pixel array, according to an aspect. The 4T pixel cell 102 includes a photodiode 106 connected to a transfer (TX) transistor 108. The TX transistor 108 can be connected to a Floating Diffusion (FD) node 110. A reset transistor 112 and a gate of a source follower transistor 114 are also connected to the FD node 110. The reset transistor 112 and the source follower transistor 114 are connected to a reset bus 116 (supply). A row select transistor 118 is connected to the source follower transistor 114 and a read bus 120. The selected row of the array is read-out, through the read bus 120, to the column array 104.

Figure 2:
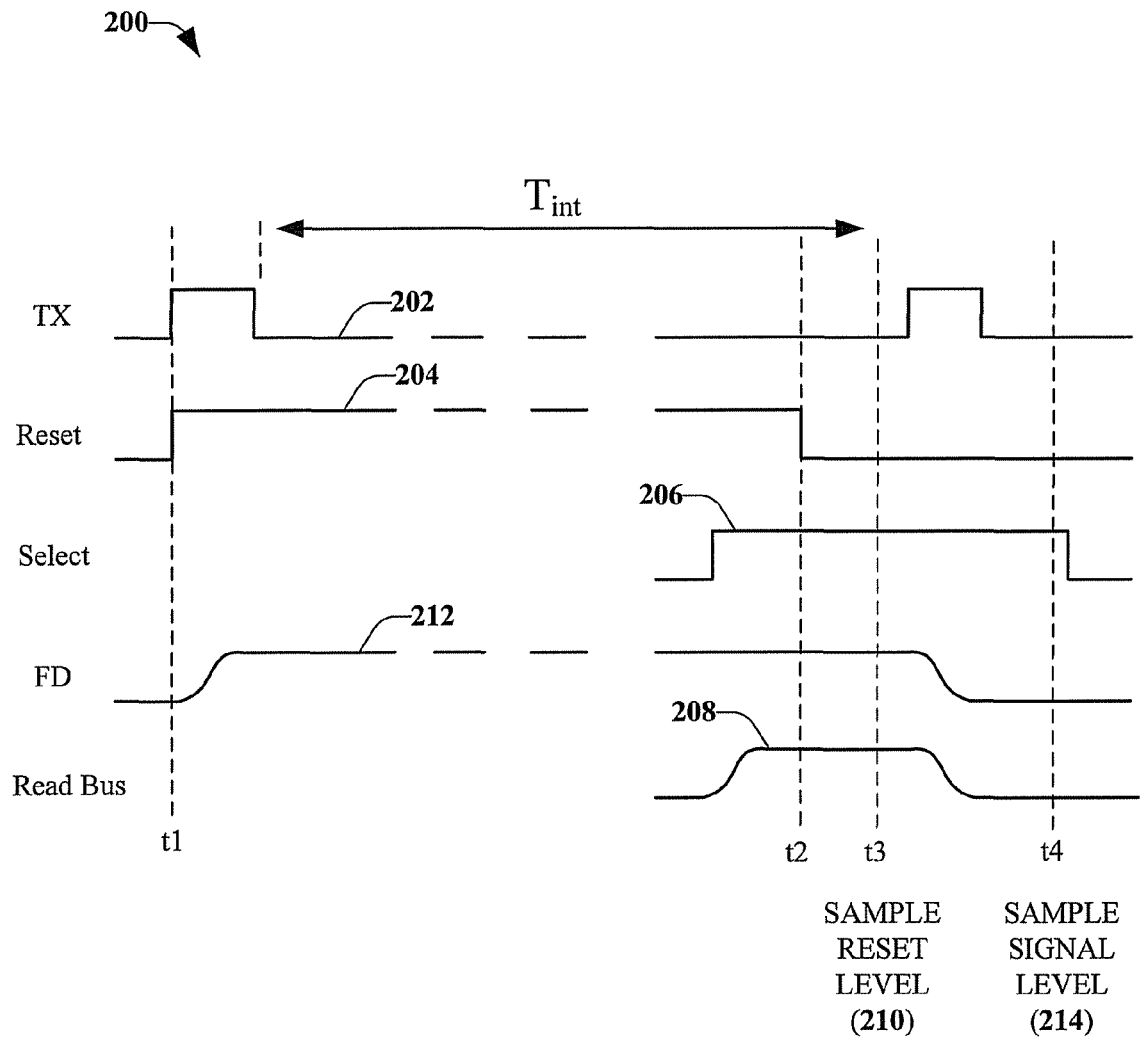
FIG. 2 illustrates a timing diagram for a standard four transistor pixel operation for rolling shutter.

FIG. 2 illustrates a timing diagram 200 for a standard 4T pixel operation for rolling shutter. The timing is applied one row at a time. A clean row can be scanned out horizontally. At each row read-out, the pixels in the row have been integrating photocurrent for a certain period of time, $T_{int}$, because they have been reset by a separate scanning event $T_{int}$ ago.

At time t1, a pixel transfer gate TX 202 is pulsed high. Also at time t1, a reset pulse is applied to the reset signal 204 in order to reset the pixel intended to be sampled. The photodiode starts integrating light, and the pixel is selected 206 shortly before integration ends. In order to read after integration or after a frame, for example, the reset signal is brought low, at time t2 after select 206 has gone high. At time t3, a readout 208 of a reset level 210 is obtained or sampled. The FD voltage level 212 is sampled (e.g., through the source follower). The charge from the photodiode is transferred to the FD node during the second TX pulse. Thus, the FD voltage level 212 drops by a corresponding integrated light intensity. At time t4 a readout 208 of the FD voltage level is sampled again. The second sampling of the FD voltage level is referred to as a signal level 214.

Figure 3:
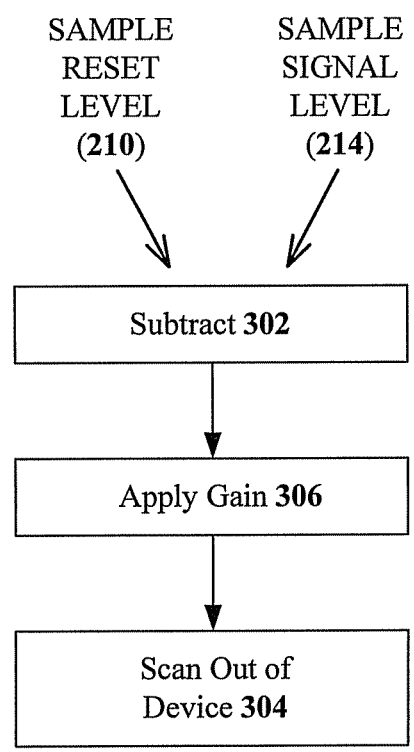
FIG. 3 illustrates a method for fixed-pattern noise correction for a four transistor pixel with the timing diagram of FIG. 2.

FIG. 3 illustrates a method for FPN correction for a 4T pixel with the timing diagram of FIG. 2. In a 4T pixel, FPN correction is performed by reading out the pixel offsets or reset levels (in a currently selected row) and storing the pixel offsets or reset levels. The pixel signal levels 214, sampled at time t4, (which have their offsets superimposed) are read out and subtracted 302 from the pixel offset or reset levels 210, sampled at time t3. At 304, the exposed image is scanned out of the device.

Optionally, in some aspects, gain 306 can be applied, after the sample signal level 214 is subtracted from the sample reset level 210. The gain can be applied at the column itself before it has the chance to progress further in the signal chain and become corrupted by noise. Because the TX 202 is brought high between the two samples without reset (as shown in FIG. 2), the subtraction 302 can correct the FPN and can also perform Correlated Double Sampling (CDS). CDS removes a source of a temporal, or a time-varying, component known as "kTC reset noise," which is caused by resetting the pixel. It also attenuates temporal noise from other mechanisms, such as flicker noise from the source follower.

Figure 4:
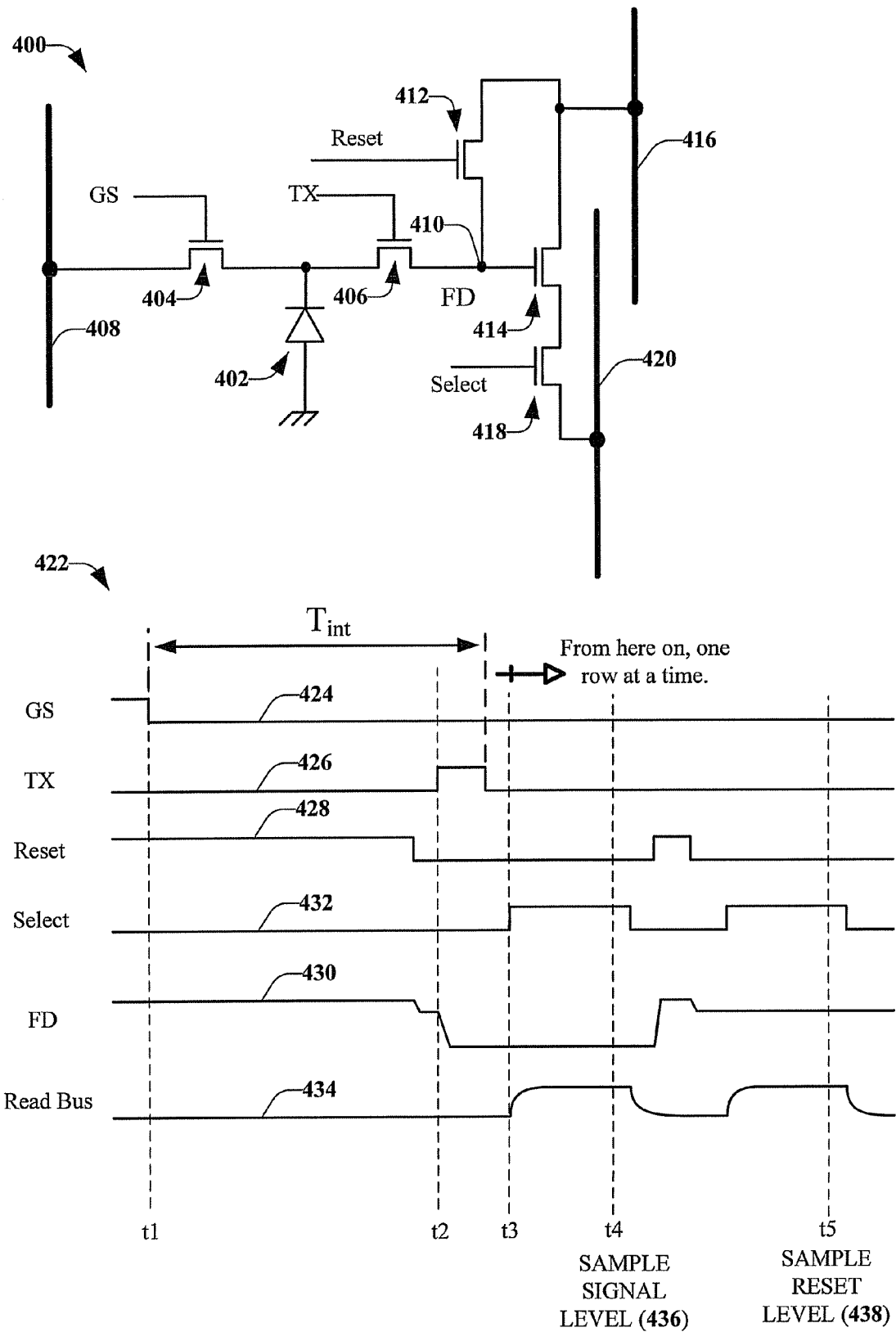
FIG. 4 illustrates a five transistor pixel operation for global shutter with external fixed-pattern noise correction.

A 5T pixel is constructed from a 4T pixel with global shutter added. In global shutter, FPN correction is not as straightforward, even with a 5T pixel. In the 5T pixel case, one transistor is used to start integration in the array and a second transistor is used to end integration in the array. Utilizing two transistors in such a manner leaves only three transistors that can be utilized for readout. While column circuitry can clean up the FPN, CDS is no longer being performed, and the result can be significantly higher temporal noise. Instead of performing CDS, the column circuitry is performing Uncorrelated Double Sampling (UDS). Operation of a 5T pixel in such a mode is shown in FIG. 4, which illustrates a 5T pixel operation for global shutter with external FPN correction.

Illustrated is a 5T pixel cell 400 that includes a photodiode 402 connected to a Global Shutter (GS) transistor 404 and a transfer (TX) transistor 406. The GS transistor 404 is connected to a GS Reset Bus 408 (supply). The TX transistor 406 is connected to a floating diffusion (FD) node 410. A reset transistor 412 and a gate of a source follower transistor 414 are also connected to the FD node 410. The reset transistor 412 and source follower transistor 414 are connected to a reset bus 416 (supply). The source follower transistor 414 is also connected to a select transistor 418, which is connected to a read bus 420.

As shown in the timing diagram 422, the GS reset bus 424 is brought low, at time t1, and period $T_{int}$ begins. When GS is off or goes low, it permits the photodiode to integrate. After period $T_{int}$, the pixel is read-out one row at a time. Thus, GS is used to start the integration and after a certain period of time, TX 426 is pulsed high (at time t2). As shown, a reset 428 operation has occurred, which resets the FD 430. The row is selected 432 at time t3. A readout 434 of a signal level 436 is sampled at time t4 and a reset level 438 is sampled at time t5. This is similar to the timing diagram 200 of FIG. 2, however, in this case, there was a reset operation performed between time t4 and time t5, which results in UDS.

Some techniques employ "electronic half-shutter". For electronic half-shutter, a mechanical shutter is needed and is used only to stop integration. Integration still starts electronically. This allows a 5T pixel device to perform global shutter with CDS, as some burden on the device has been removed. While this may have advantages in some applications, it still requires moving parts (e.g., the mechanical shutter).

Another option for (full) global shutter is to read-out an offset-only (or FPN) map, and store the map outside the readout block, typically after digitization. Then the exposed image is read-out and correction is performed digitally. This allows a 5T pixel device to maintain CDS functionality, as shown in the operational scheme of FIG. 5.

The disclosed aspects address at least one performance issue with the stored FPN map scheme, which is, namely, dynamic range. A pixel has a finite amount of charge-storage capability, limiting the lux-seconds of light that the pixel can measure before saturation occurs. On the dark end, performance is limited by temporal noise from various sources. The latter can be minimized by using a high front-end analog gain, as this can substantially reduce the input-referred noise from the later stages of the chain, including the A-to-D converter and its quantization noise. The FPN inundates the output at a modest gain level. If the pixel FPN can be corrected at the front end, high analog gain can be used. The disclosed aspects can solve this problem through utilization of a pixel reset system, while maintaining CDS functionality. The disclosed aspects can also provide a quality performance, wide dynamic range system with fully electronic global shutter using 5T pixels.

Figure 5:
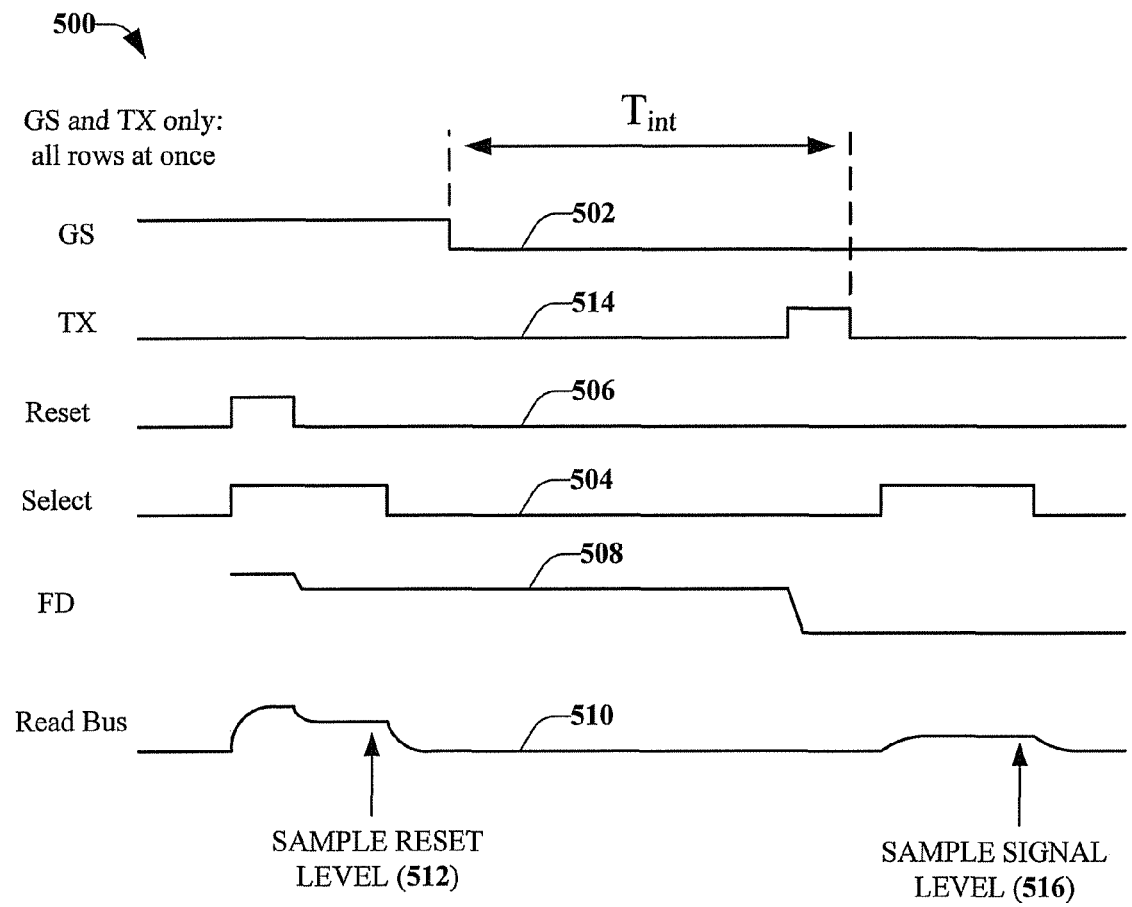
FIG. 5 illustrates a timing diagram of an operational scheme of a five transistor pixel device.
Figure 6:
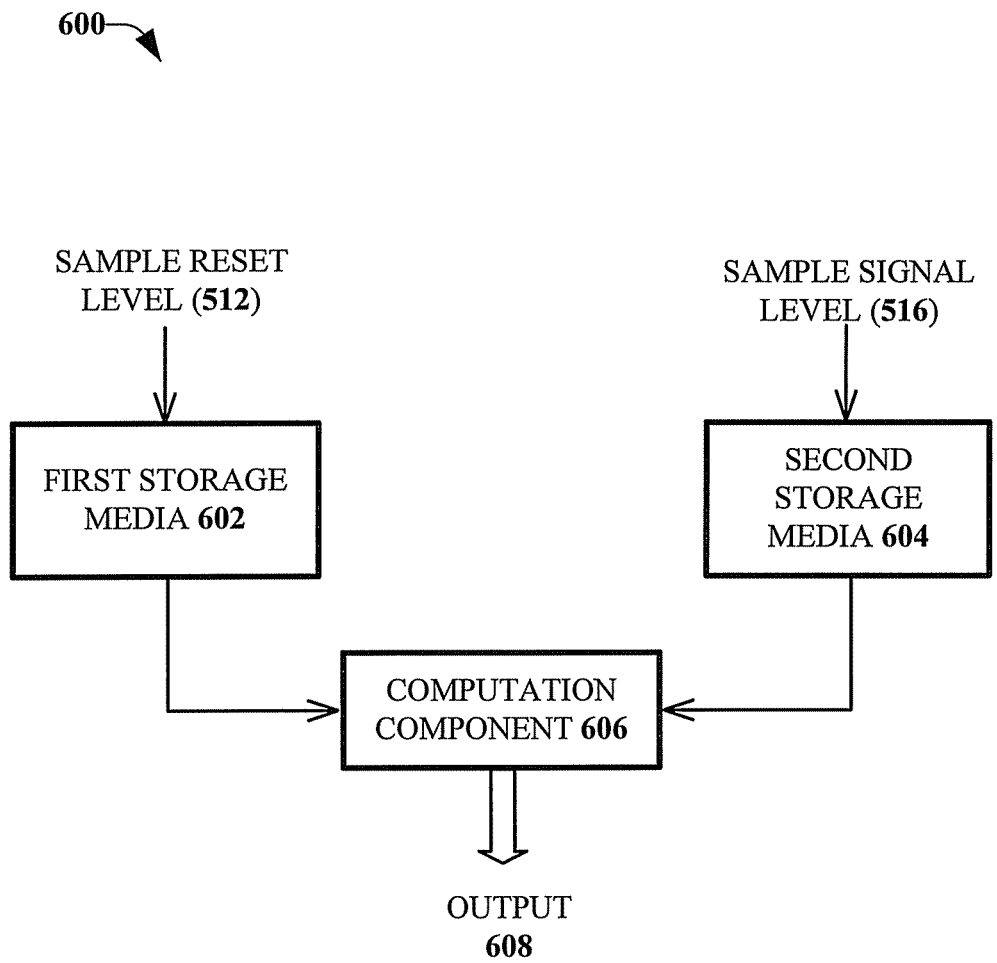
FIG. 6 illustrates a system that can be utilized with the timing diagram of FIG. 5.

The scheme of FIG. 5 is now described in further detail and with reference to FIG. 6, which illustrates a system 600 that can be utilized with the timing diagram 500 of FIG. 5. The signals illustrated refer to the 5T pixel diagram of FIG. 4. The Global Shutter (GS) line 502 starts out high, connecting the photodiode to the power rail and preventing integration from starting, for all pixels in the array; hence the name Global Shutter for this line. During the GS high period, the pixel FPN is scanned out, one row at a time; this is known as "progressive" reset and scan. To read the offset value for each pixel (which form FPN collectively), the select line 504 for the row is brought high, and its corresponding reset line 506 is brought high, in order to clear out any prior image information. Then the reset line 506 is brought low, which causes the floating diffusion (FD) node to drop in voltage 508 from the original level of the reset bus, which, in some aspects, is the power supply. This drop is due to charge injection, and is typically in the hundreds of milliVolts. Mismatches in this can be a source of FPN, though other sources of FPN can include the pixel source follower device and its bias source.

The select line 504 is still high and, therefore, the read bus 510 level can be sampled (e.g., sample reset level 512). The sampled reset level 512 contains the information of all (or substantially all) major contributors to pixel FPN, with the exception of dark signal non-uniformity, which cannot be sampled in one event. The sampled reset level 512 can be read-out of the device and can be retained in a first storage media 602 (FIG. 6). In some aspects, the information retained in the first storage media 602 includes FPN as well as temporal noise information that can also be cancelled out. According to some aspects, the first storage media 602 can be a frame memory, which is a map of all the offsets. In other aspects, the first storage media 602 is an FPN memory.

After all rows are scanned, the GS line 502 goes low, and all pixels start integrating. At the end of the integration period, interval $T_{int}$ later, the global transfer gate (TX) signal S14 goes high, placing the charge on the FD node and effectively stopping integration when the TX signal S14 goes low. The read bus 510 level is sampled (e.g., sample signal level 516). In an aspect, the sampled signal level 516 is scanned into a second storage media 604 (FIG. 6), with progressive row scanning. According to some aspects, the second storage media 604 is a signal memory. In accordance with some aspects, the sampled reset level 512 and the sampled signal level 516 can be retained in a single storage media (e.g., two storage medias are not needed). In some aspects, the first storage media 602 and/or the second storage media 604 can be internal storage medias, external storage medias, or combinations thereof (e.g., first storage media 602 is internal and second storage media 604 is external; or first storage media 602 is external and second storage media 604 is internal).

The two stored images are subtracted, by a computation component 606 that provides an output 608, which is an FPN-corrected image. In accordance with some aspects, computation component 606 performs the subtraction digitally. A digitally stored FPN map can provide the advantage of being able to correct for pixel dark signals, provided the system includes an appropriate calibration routine. However, the disclosed aspects are not limited to a digital process and other processes can be utilized. The result of the output 608 is cancellation of the temporal noise and the FPN. Thus, system 600 performs FPN correction and is also performing CDS, since the FD node is not reset between the two samples. In an aspect, the GS timing 502 can be altered to go high after the TX pulse, which may affect pixel performance.

Figure 7:
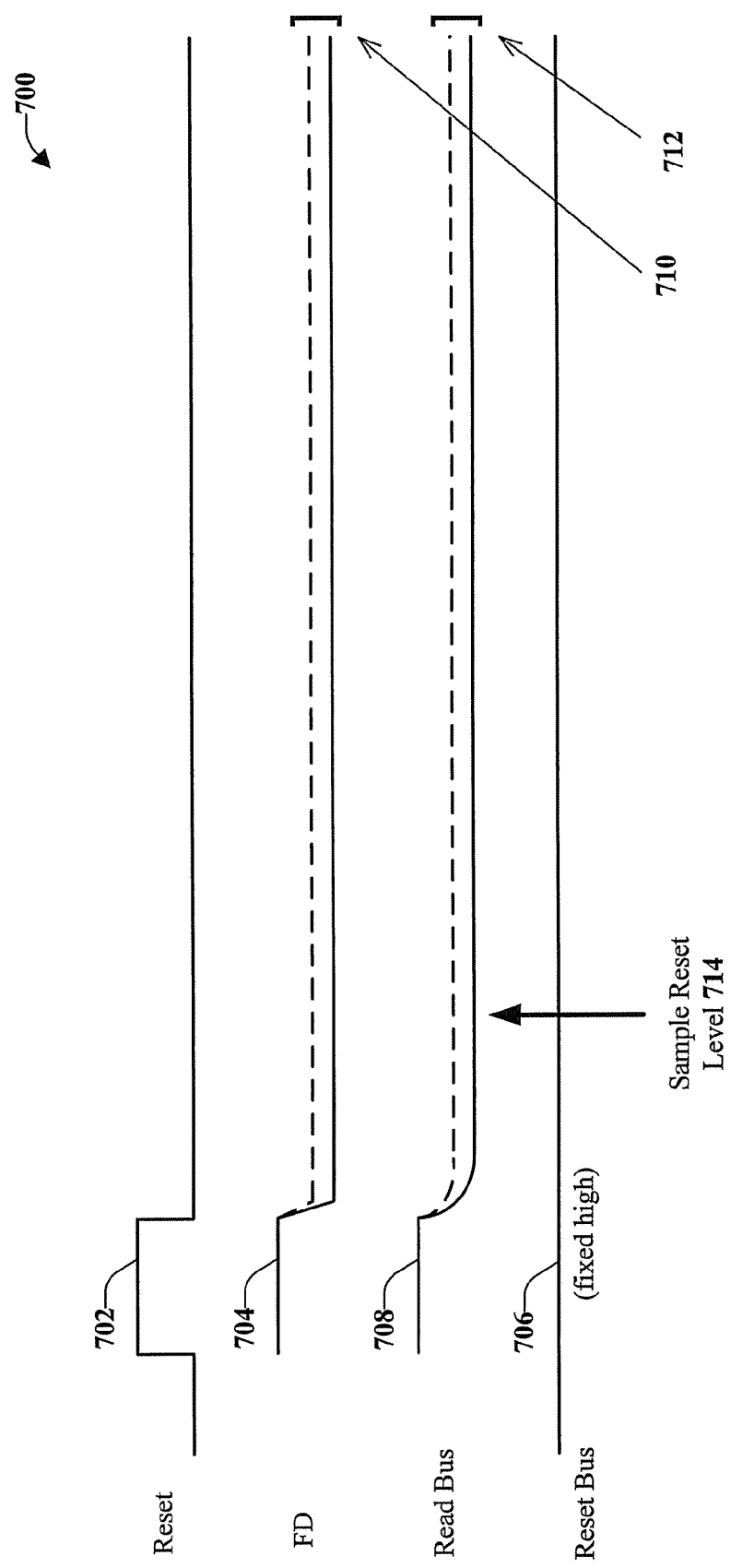
FIG. 7 illustrates a reset period detail to demonstrate what occurs during and after the reset pulse of FIG. 5, in which two rows, each corresponding to one pixel, are superimposed (solid and dashed)

FIG. 7 illustrates a reset period detail to demonstrate what occurs during and after the reset pulse of FIG. 5, particularly for two pixels with different charge injection levels. The select line (not shown) is always high. Further, the time scale has been extended; however, everything else is similar to FIG. 5 for illustration purposes. During the reset pulse 702, the FD node 704 is set to the reset bus level 706, which can be fixed by standard design, according to an aspect. When the reset line 702 falls, the FD node 704 and read bus levels 708 fall due to charge injection, for both pixels. Shown at 710 are two rows with different offsets, with corresponding levels at 712.

There is a difference between the two pixels, as their charge injections are different. This manifests as FPN, and limits the amount of analog gain that can be applied at the front end without saturating the signal chain, such as subsequent gain stages prior to the A-to-D converter. Note that other device mismatches, such as source follower threshold voltage, would also manifest in the sampled reset level 714. Further, the read bus levels 708 in FIG. 7 would be split during the reset pulse as well.

Figure 8:
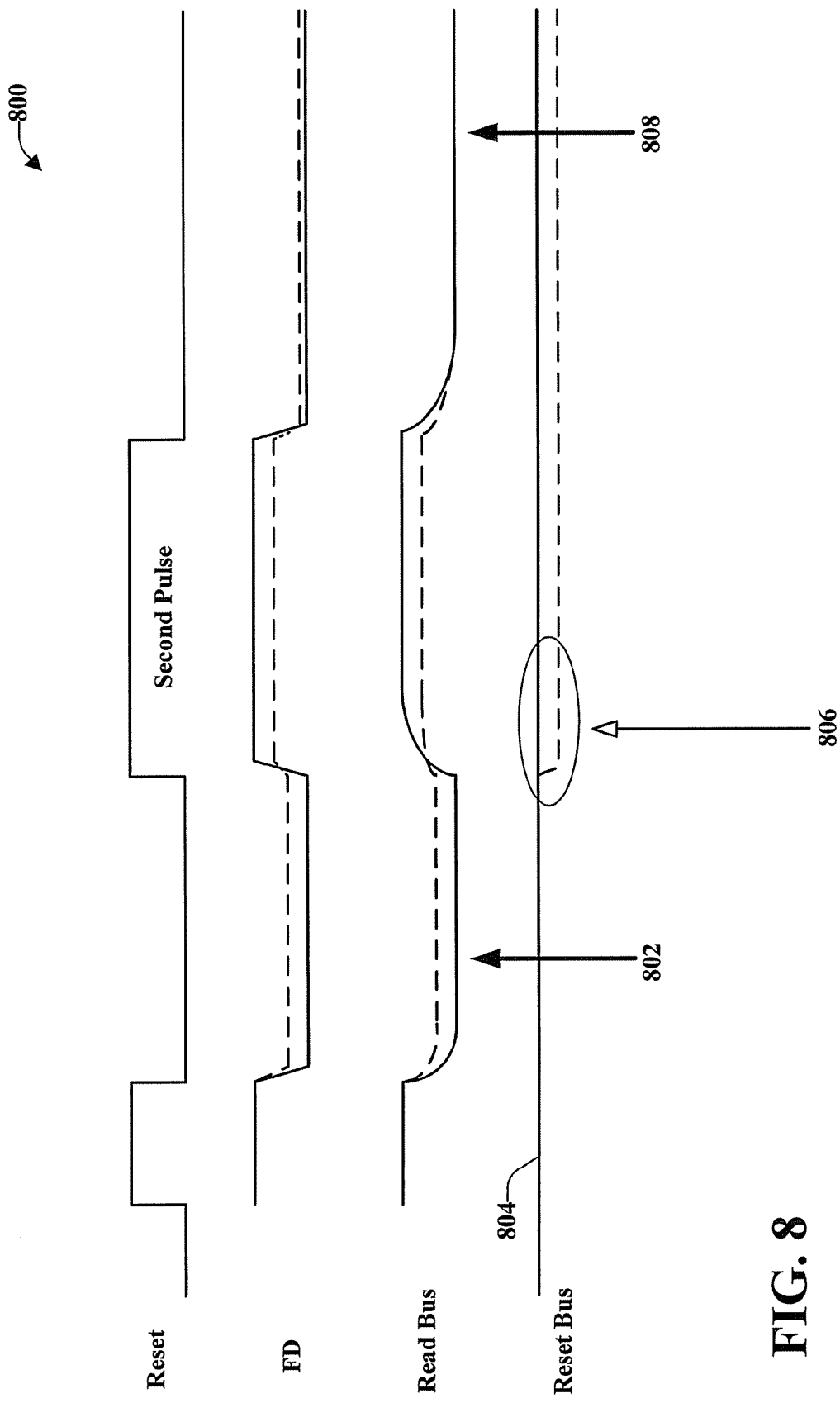
FIG. 8 illustrates modification of events of FIG. 7 to eliminate, or substantially eliminate, the fixed-pattern noise, according to an aspect.

FIG. 8 illustrates modification of events of FIG. 7 to eliminate, or substantially eliminate, the FPN, according to an aspect. A reset level is sampled, at 802. The reset level is utilized to adjust the level of the reset bus 804, at 806. The pixel is sampled a second time, at 808. In accordance with some aspects, the pixel can be reset a second time, at 808.

Feed-forward adjustment is performed, at 806, to compensate for the pixel offset. In such a manner, at the end of 808, the FPN is removed, or substantially removed. Then, a high front-end analog gain can be applied without saturating the signal chain. The readout of the reset level, at 808, can be retained in an internal storage media or an external storage media. Retaining the readout can allow the readout to be utilized for CDS. Additionally or alternatively, the retained readout can be utilized to capture any residual FPN due to non-ideal performance of the system.

In accordance with some aspects, if CDS is not used, the readout of the FPN map can be omitted, and instead the FPN map can be derived from calibration using an optically dark image. However, in this aspect, progressive array scanning is performed before integration starts, and a calibration step is utilized.

Figure 9:
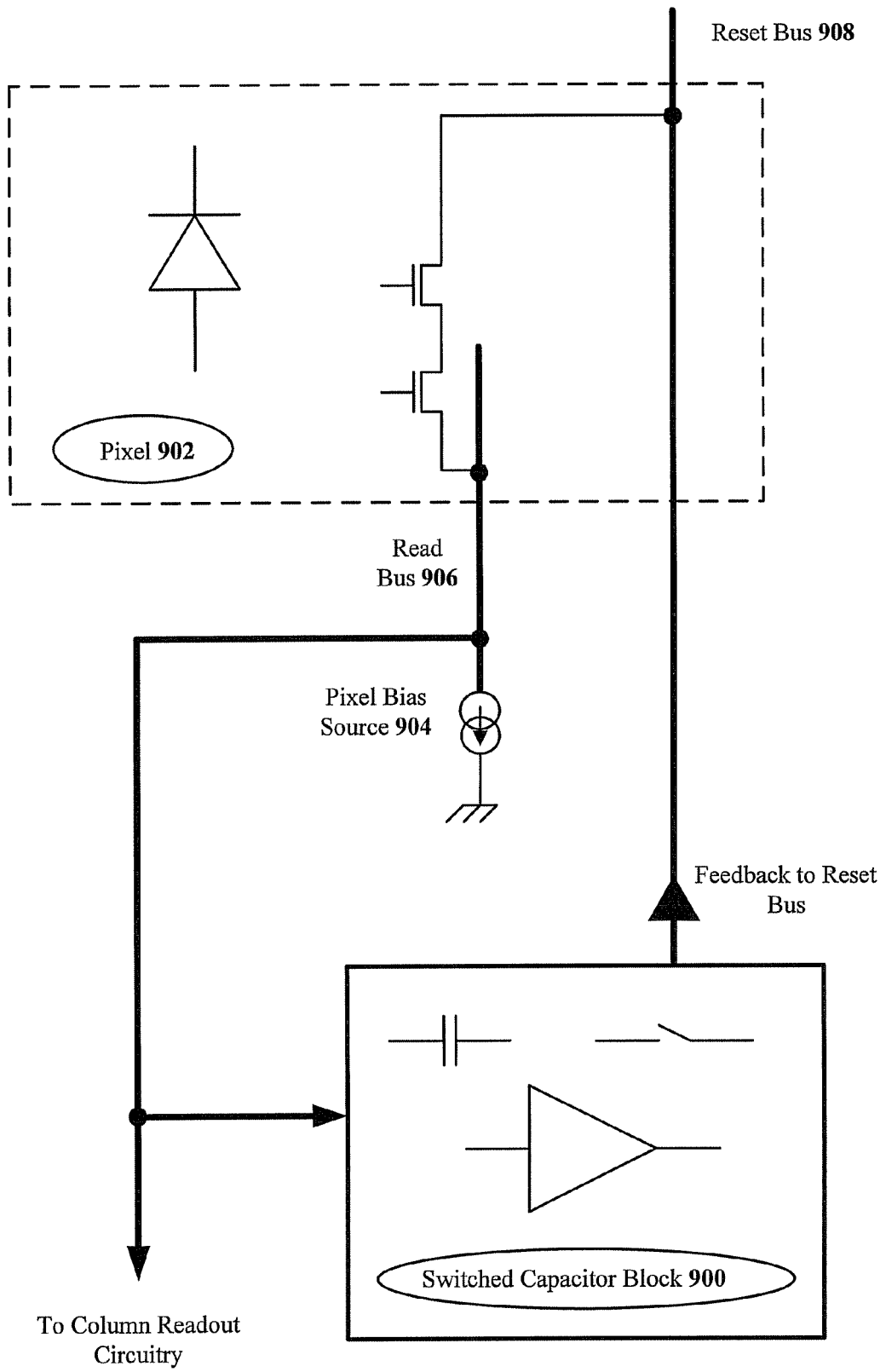
FIG. 9 depicts an example implementation of a system that performs the functions of FIG. 8, according to an aspect.

FIG. 9 depicts an example of implementation of a system that performs the functions of FIG. 8, according to an aspect. FIG. 9 illustrates a switched capacitor block 900 and a pixel 902 being reset in the front-end pixel FPN correction system, according to an aspect. A standard current bias source or pixel bias source 904 for the pixel read bus 906 is shown. The switched capacitor block 900 performs the adjustment to the reset bus level based on the sampled reset level (e.g., 806 based on 802, both of FIG. 8). In this example, the reset bus 908 is no longer tied to a power rail or other constant source.

In accordance with some aspects, any block that performs the adjustment to the reset bus level based on the sampled reset level (e.g., 806 based on 802 of FIG. 8) can be utilized. According to an aspect, in CMOS, a switched capacitor implementation can be utilized to adjust the reset bus level.

The read bus 906 is connected to the switched capacitor block 900 and any column circuitry for readout. In accordance with some aspects, the switched capacitor block 900 is an independent add-on from the circuit perspective.

Figure 10:
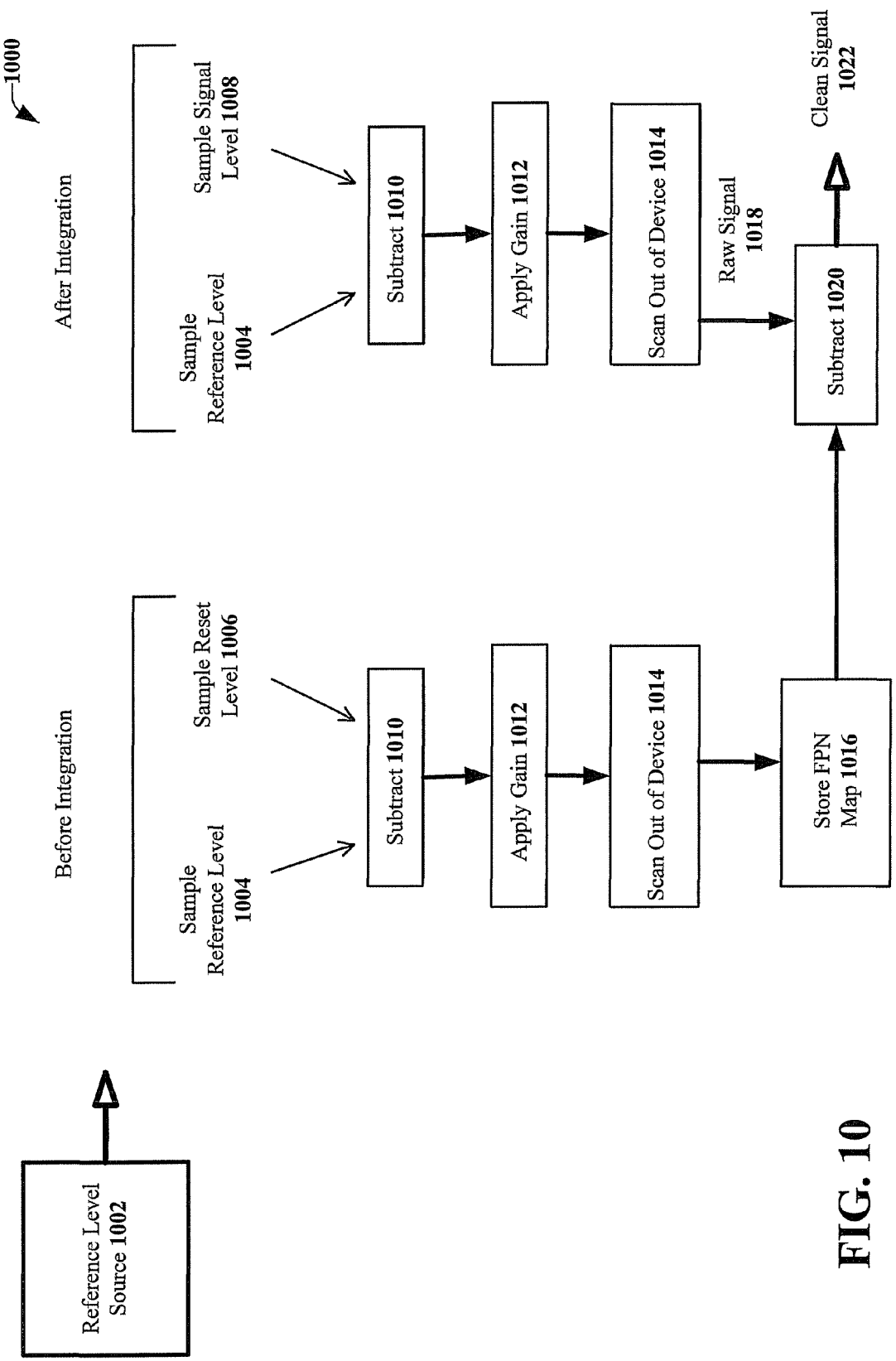
FIG. 10 illustrates an example flow diagram for obtaining an fixed-pattern noise-corrected image, according to an aspect.

FIG. 10 illustrates an example flow diagram 1000 for obtaining an FPN-corrected image, according to an aspect and is based on the scheme of FIGS. 5 and 6. The FPN-corrected image can be derived as a function of a reference level source 1002. According to an aspect, a reference level 1004 can be utilized to implement a readout, which can allow high gain at the front end of the readout. The high gain can allow high performance global shutter operation while using the back-end column circuitry with functionality shown in FIG. 3 for subtraction, gain, and scan-out.

As illustrated, the read bus output has a nominal level corresponding to the reference level 1006 or the signal level 1008 in the dark. Though FPN is present, a reference generator can be set at or near the nominal level. By subtracting 1010 the reference level, the output of a gain block 1012 can remain within its proper operating limits for much higher gain settings than otherwise possible. In some aspects, the image can be scanned out of the device 1014 and stored in an FPN map 1016, for example. After integration, a raw signal 1018 can be subtracted 1020 from the stored FPN map 1016, resulting in a clean (or substantially clean) signal 1022.

In many devices, the subtract 1010 and apply gain 1012 steps of FIG. 10 can be easy to implement in the column, because these steps represent functions that are compatible with functions used in the standard 4T readout of FIGS. 1, 2, and 3. Thus, the disclosed aspects are readily compatible with existing implementations. This can be true regardless of whether a traditional scanned analog or a column-parallel ADC type architecture is used.

Figure 11:
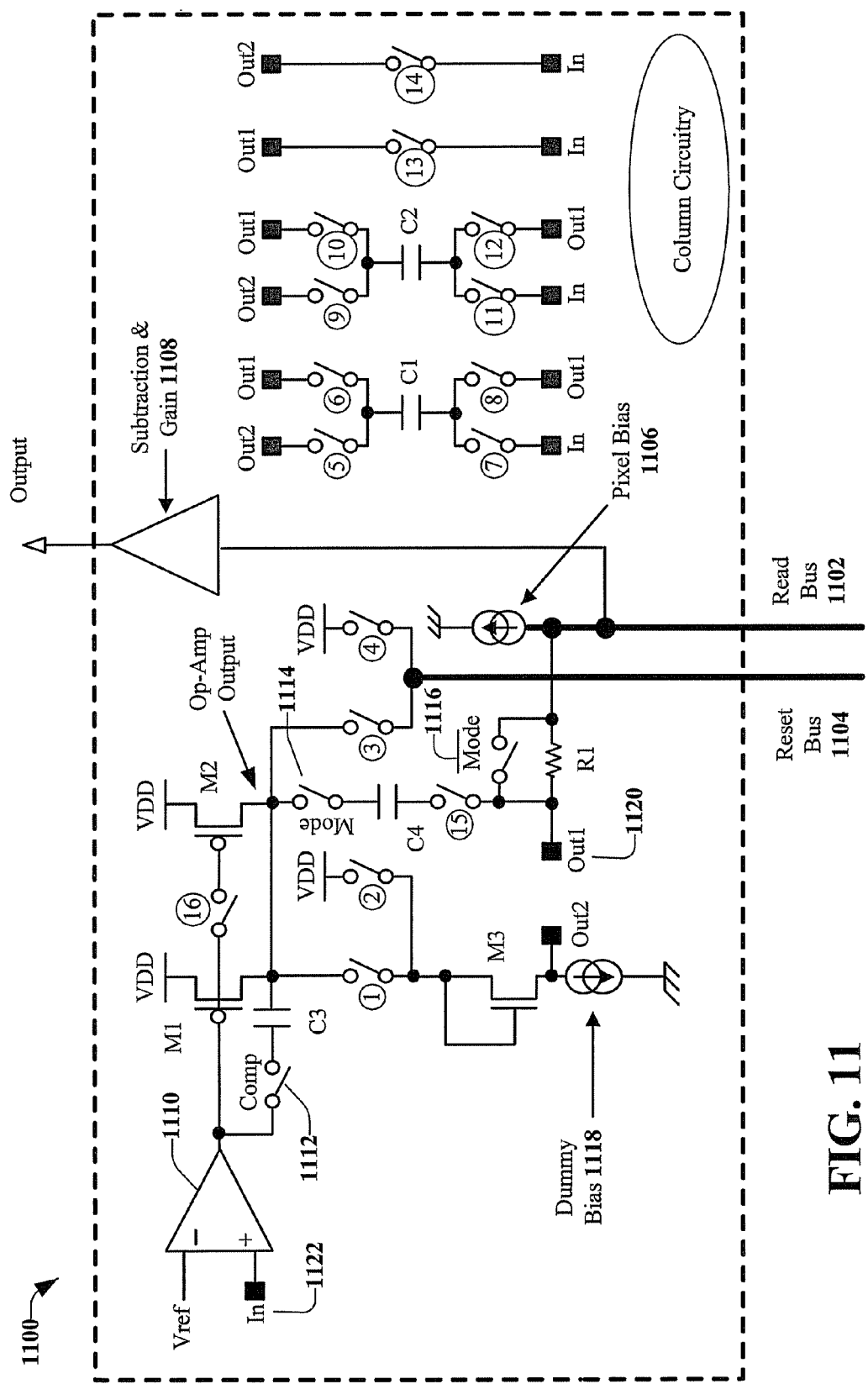
FIG. 11 illustrates an example column circuitry, according to an aspect.

In accordance with some aspects, the switched-capacitor block 900 of FIG. 9 can be implemented in a variety ways; what follows is an embodiment according to an aspect, with a discussion of possible variations. FIG. 11 illustrates an example column circuitry 1100, according to an aspect. The example column circuitry 1100 includes a read bus 1102, a reset bus 1104, a current source for pixel bias 1106, and a unit 1108 for subtraction and gain. In addition, the example column circuitry 1100 includes an amplifier 1110, capacitors, labeled C1, C2, C3, and C4, several switches (as FET pass-gates) labeled 1 through 16, an extra current source, and FET devices.

In FIG. 11, an Amp block 1110, PFET device M1, PFET device M2, capacitor C3, capacitor C4, resistor R1, switch 16, Comp switch 1112, a first Mode switch 1114, and a second Mode switch 1116 comprise an operational amplifier (or op-amp). The output driver of the op-amp includes PFET devices M1 and M2, where switch 16 can enable or disable M2 (in the latter state the gate is tied to the supply rail by means not shown), and is powered by supply VDD. Hence, the drive strength of the output stage can be selected between at least two levels. The bias current through these devices can be provided by either the Pixel Bias 1106 or Dummy Bias 1118 current source, which flows through the load, as will be explained below.

The Amp block 1110 includes a trans-conductance stage, which, in some aspects, can be a simple 5-transistor implementation. In accordance with some aspects, the Amp block can be a standard operational amplifier. The capacitor C3 is for compensation. In some aspects, the Comp switch 1112 is always closed, connecting capacitor C3 and providing Miller feedback for the op-amp. A resistor may be put in series with capacitor C3, according to an aspect. Mode is a static bit that is normally low, so the Mode switch 1114 is always open (and the Mode-bar switch 1116 is always closed), disconnecting capacitor C4 and shunting R1, according to an aspect. Thus, an Out1 node 1120 is connected directly to the Read Bus 1102; in the system, Out1 node 1120 provides feedback to the input In 1122 of the op-amp through capacitors or a direct connection.

In accordance with some aspects, the op-amp can be operated in a mode with two dominant poles, which can be set up when the static bit Mode is high. This can enable the high-pass network of resistor R1 and capacitor C4, so that the Op-Amp Out node has a direct path to the Out1 node 1120 at high frequencies, providing a zero in the transfer function. This is referred to as "pass-thru" mode. Note that for this, the Comp switch should be open and switch 15 should be closed. These two switches (Comp switch and switch 15) can be both controlled by timing signals, as the Miller compensation is still needed during certain periods. Through pass-thru mode offers potentially faster operation than the Miller compensation, it is also more aggressive from a design standpoint.

Figure 12:
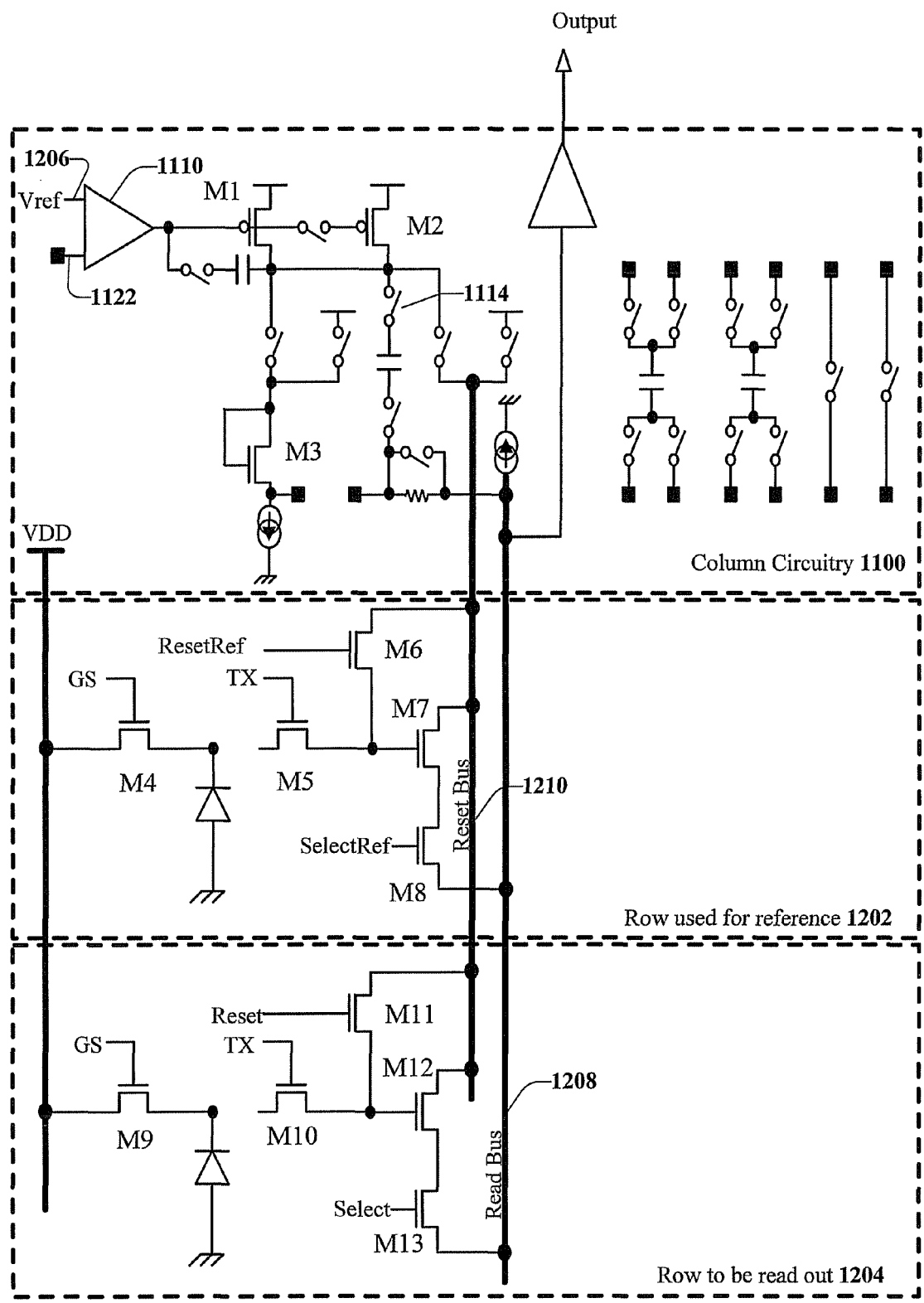
FIG. 12 illustrates the column circuitry of FIG. 11, with a pixel in a row used to generate the reference level, and with a pixel in a row to be read out (for reset level), according to an aspect.
Figure 13:
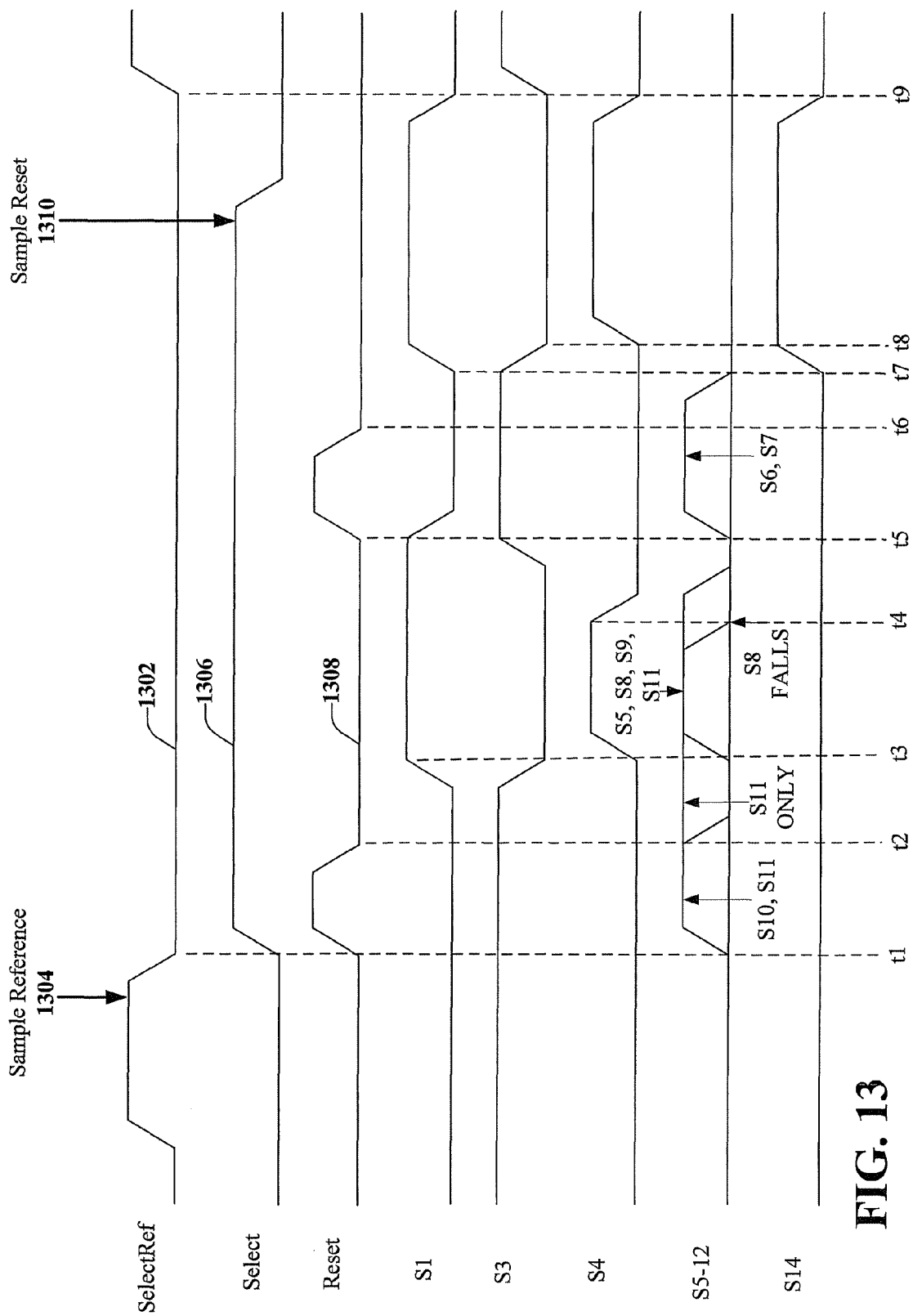
FIG. 13 illustrates an example timing used to run the pixels and the column circuitry, according to an aspect.
Figure 14:
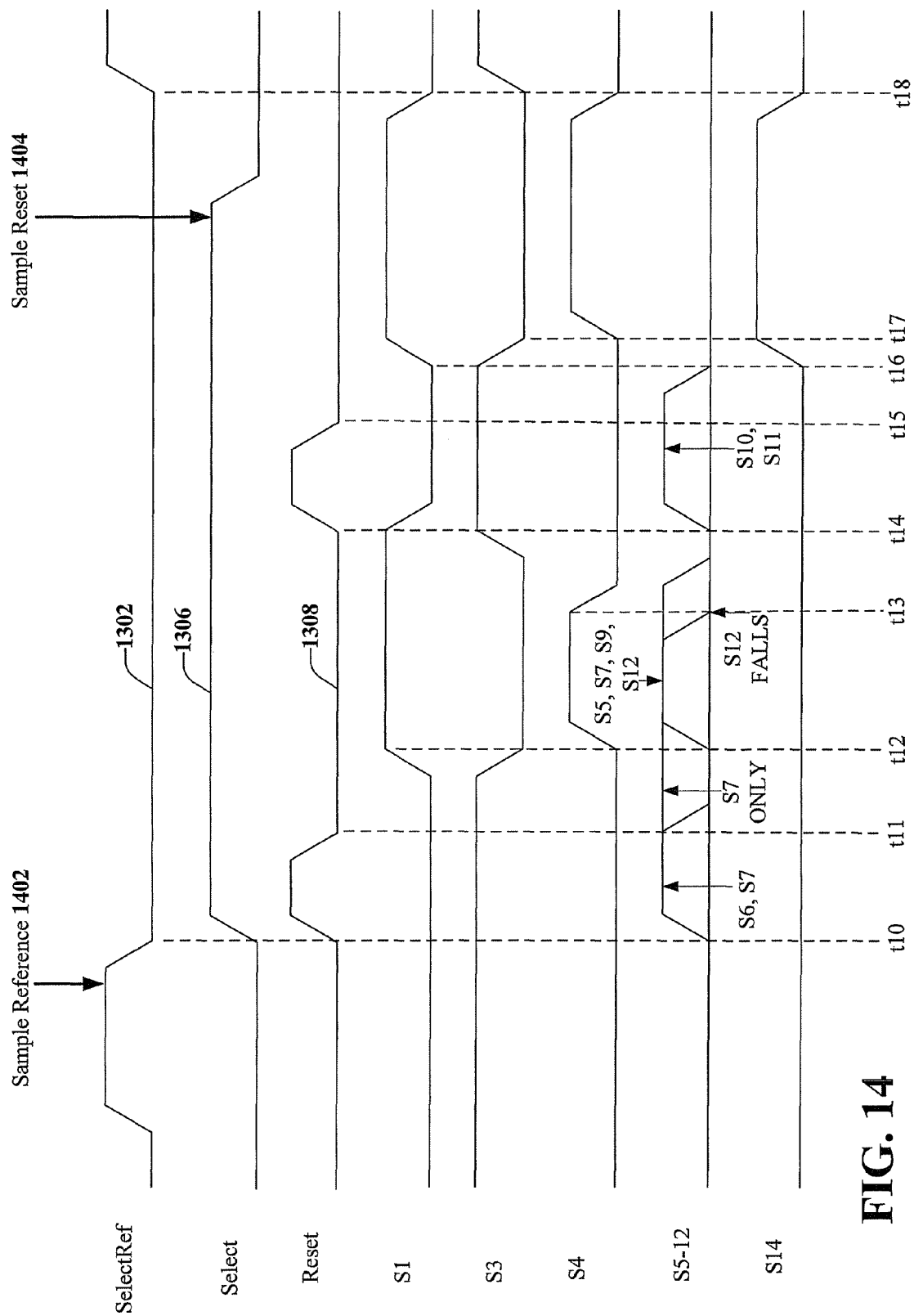
FIG. 14 illustrates another example timing used to run the pixels and the column circuitry, in accordance with an aspect.

FIG. 12 illustrates the column circuitry 1100 of FIG. 11, with a pixel in a row 1202 used to generate the reference level (in FIG. 10), and with a pixel in a row 1204 to be read out (for reset level), according to an aspect. The timing used to run the pixels and the column circuitry (except the Subtraction & Gain block) is shown in FIGS. 13 and 14. Timing (not shown in FIGS. 13 and 14) is provided in Table 1 below, which refers to FIG. 13. The TX lines for the pixels are always low, and the GS lines are typically high, as shown in the beginning period of FIG. 5. The op-amp positive input, which is the negative input 1206 of the Amp block 1110, is tied to a constant dc voltage Vref, which is used to generate the reference level in FIG. 10.

TABLE 1

| Timing Signal | Similar to: |
| --- | --- |
| ResetRef | SelectRef |
| Comp | High when Mode = 1, else S1 |
| S2 | Inverse of S1 |
| S13 | SelectRef |
| S15 | Inverse of S1 |
| S16 | Inverse of S1 |

FIG. 13 illustrates a timing diagram for the column circuitry and pixels of FIG. 12, applied to one set of alternate rows. A select reference line 1302 is pulsed high and a reference value 1304 is sampled. S3 is initially high. At time t1, a select line 1306 and a reset line 1308 are pulsed high and S10 and S11 also go high, S3 is still high. When the reset line 1308 goes low at time t2, S10 goes low and S11 remains high. At time t3, S1 goes high and S3 goes low before S4, S5, S8, and S9 go high (while S11 stays high). At time t4, S8 falls and S4 starts to go low. S5, S9, and S11 go low. At time t5, S3 goes high and then reset line 1308 is pulsed high, S6, and S7 go high and S1 goes low. At time t6, reset line 1308 goes low. At time t7, S6 and S7 go low, then S1 and S14 go high and S3 goes low. At time t8, S3 is low and S14 is high, then S4 goes high. A sample reset is taken at 1310. At time t9, S1, S4, and S14 go low and then S3 goes high.

FIG. 14 illustrates a timing diagram for the column circuitry and pixels of FIG. 12, applied to a set of alternative rows complementary to that of FIG. 13. The timing of FIG. 13 is applicable for an arbitrary row in the readout sequence. However, the subsequent row utilizes the timing of FIG. 14, which is similar to FIG. 13, except that the roles of C1 and C2 are interchanged. From then on, the timing continues to alternate between the timing of FIG. 13 and the timing of FIG. 14.

As shown in FIG. 14, the select reference line 1302 is pulsed high and a reference value 1402 is sampled. At time t10, the select line 1306 and reset line 1308 are pulsed high and S6 and S7 go high. The reset line 1308 goes low and then S6 goes low, at time t11. At time t12, S1 goes high and S3 goes low, and then S4, S5, S9, and S12 go high (while S7 stays high). At time t13, S12 falls and S4 begins to go low. At time t14, S3 goes high and then the reset line 1308 is pulsed high and S10, and S11 go high and S1 goes low. At time t15, the reset line 1308 goes low. At time t16, S10 and S11 go low and then S1 and S14 go high and S3 begins to go low. At time t17, S3 goes low and S4 begins to go high. A reset value 1404 is sampled. At time t18, S1, S4, and S14 go low, the Select Reference Line 1302 is pulsed high and then S3 goes high.

Figure 15:
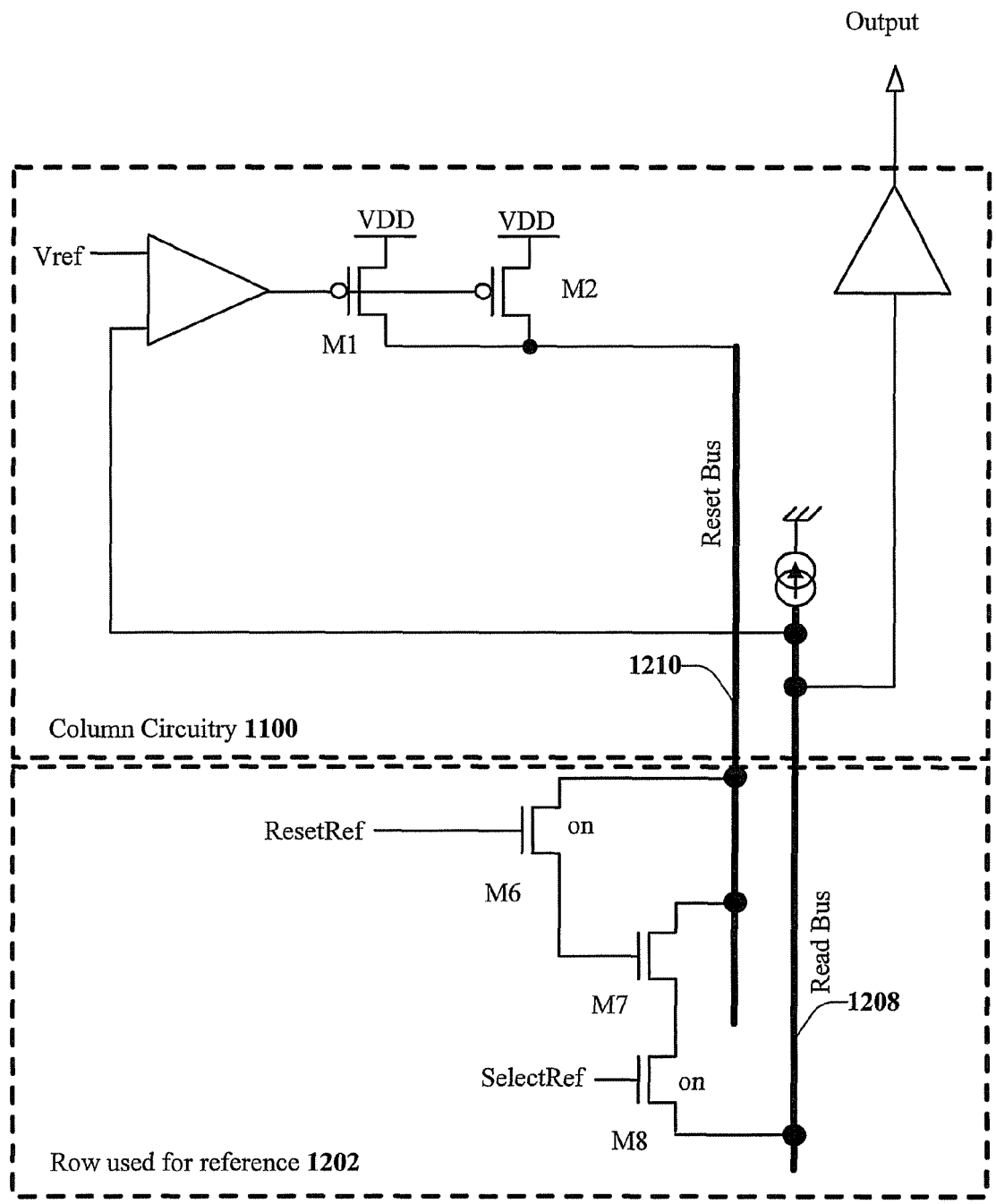
FIG. 15 illustrates the column circuitry of FIG. 12 when configured to generate the reference level and the pixel in a row used to generate the reference level, according to an aspect.

FIG. 15 illustrates the column circuitry 1100 of FIG. 12 when configured to generate the reference level (of FIG. 10) and the pixel in a row used to generate the reference level 1202. FIG. 15 corresponds to the period in FIG. 13 when SelectRef is high. As the pixel reset device M6 is always on, the pixel source follower device M7 and select device M8 (NFETs) are in a feedback loop with the op-amp. The read bus 1208 carries a buffered version of Vref, perturbed by the input-referred offset of the op-amp. By placing a pixel in the feedback loop, the op-amp output voltage can be about the same as the op-amp output voltage in other phases of timing. This can make the system more robust against finite op-amp gain, as the offset can be cancelled by the system, as will be explained below. Note that both output driver devices M1 and M2 are active, for high drive, as the Reset Bus 1210 typically presents a large capacitive load to the op-amp output. In principle, any row in the array can be used to help generate the reference.

Figure 16:
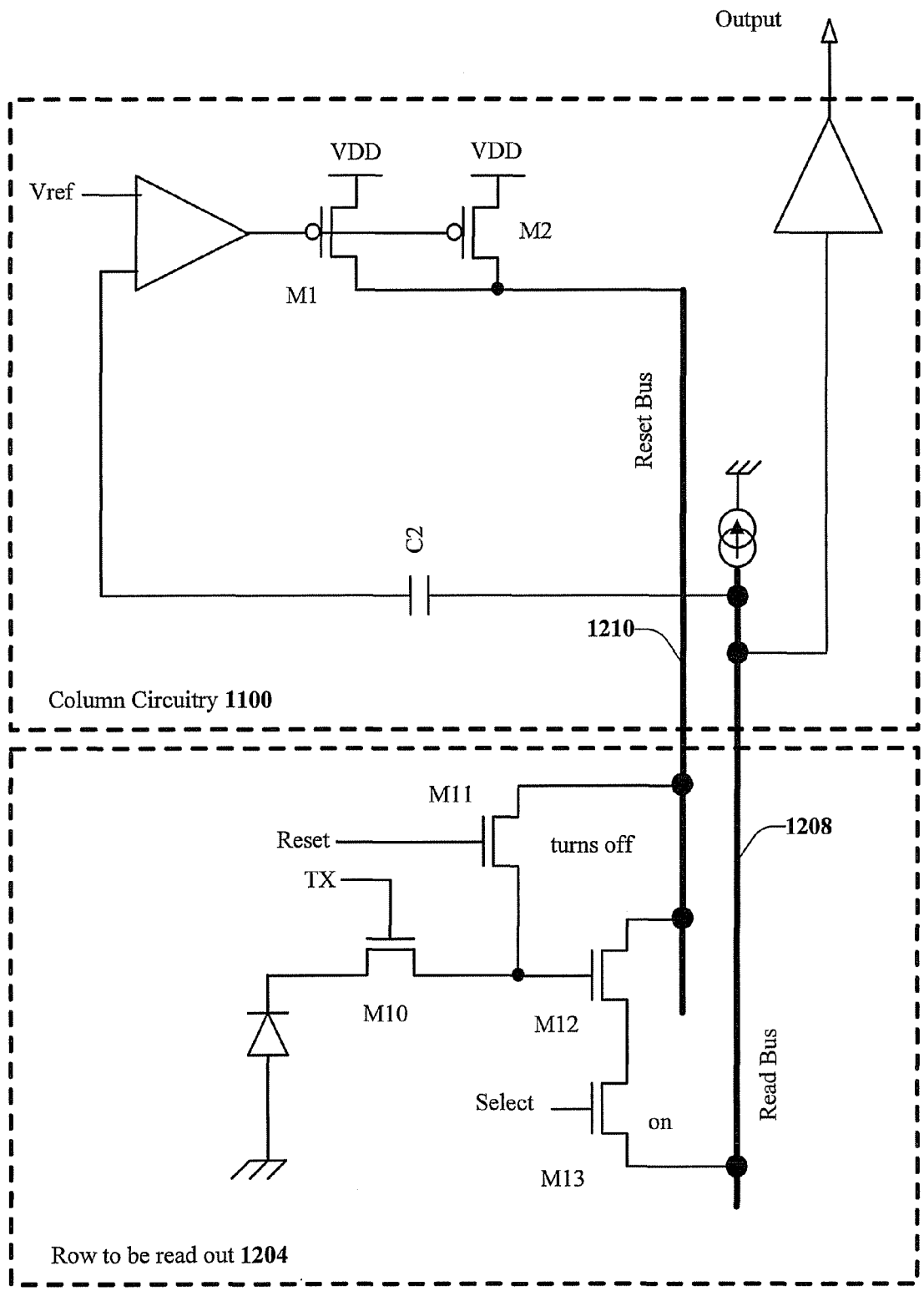
FIG. 16 illustrates the column circuitry of FIG. 12 when configured to reset the pixel in a row to be read out, according to an aspect.

FIG. 16 illustrates the column circuitry 1100 of FIG. 12 when configured to reset the pixel in a row to be read out 1204. This corresponds to the period in FIG. 13 when S10 is high, and includes the first reset pulse (which corresponds to that in FIG. 8 for 802 also). The select device M13 is on, and the reset device M11 is initially "on". Capacitor C2 is in the resulting feedback loop, and the voltage imposed on the read bus 1208 is the sum of Vref and the voltage stored on C2. However, the C2 voltage is nominally the read bus 1208 voltage change due to charge injection, and it attains this by the action of the switched capacitor circuitry during the prior row. The result is that after M11 turns off, the read bus level is nominally Vref. This level does not have to be precise.

In accordance with some aspects, if the present row is the first row scanned after the device has been idle or powered off, a separate pulse, such as a system-wide reset pulse, can be used to discharge C2 to zero. The system will function, though the performance of the first and second rows may be impaired. According to some aspects, these can be treated as dummy rows. An alternate embodiment can use a separate source to pre-charge C2, or any other level-shifter means.

Figure 17:
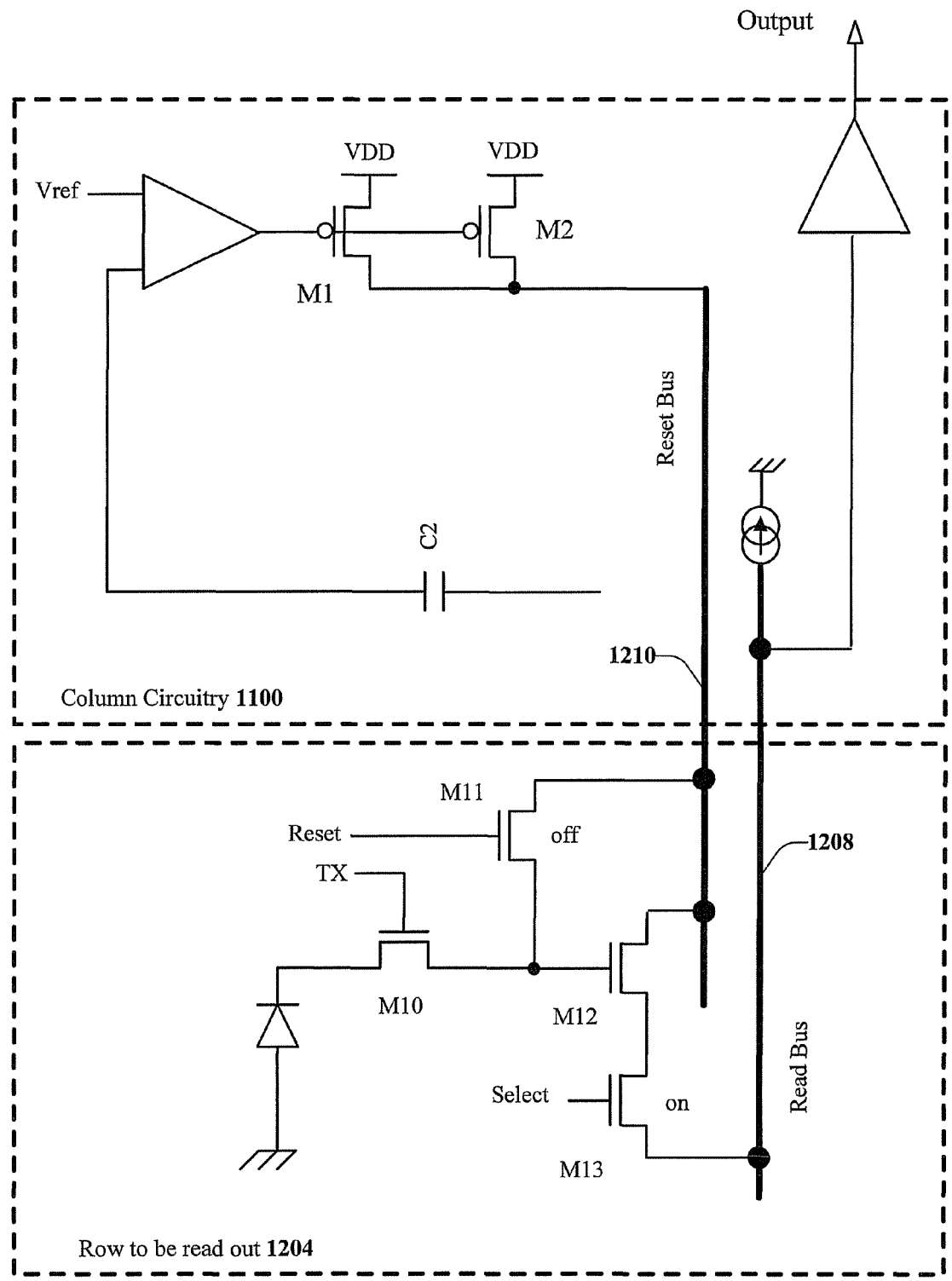
FIG. 17 illustrates the column circuitry of FIG. 12 shortly after the first reset event of FIG. 13, according to an aspect.

FIG. 17 illustrates the column circuitry 1100 of FIG. 12 shortly after the first reset event of FIG. 13. Also illustrated is the row to be read out 1204. Here S10 has turned off, breaking the feedback loop. However, S11 remains connected, so that the charge-sensitive amplifier input node is not disturbed. The pixel is not disturbed, because M11 has already turned off. Capacitor C2 is disconnected from the read bus, but only after the Reset line has gone low, in further preparation of 802 in FIG. 8.

Figure 18:
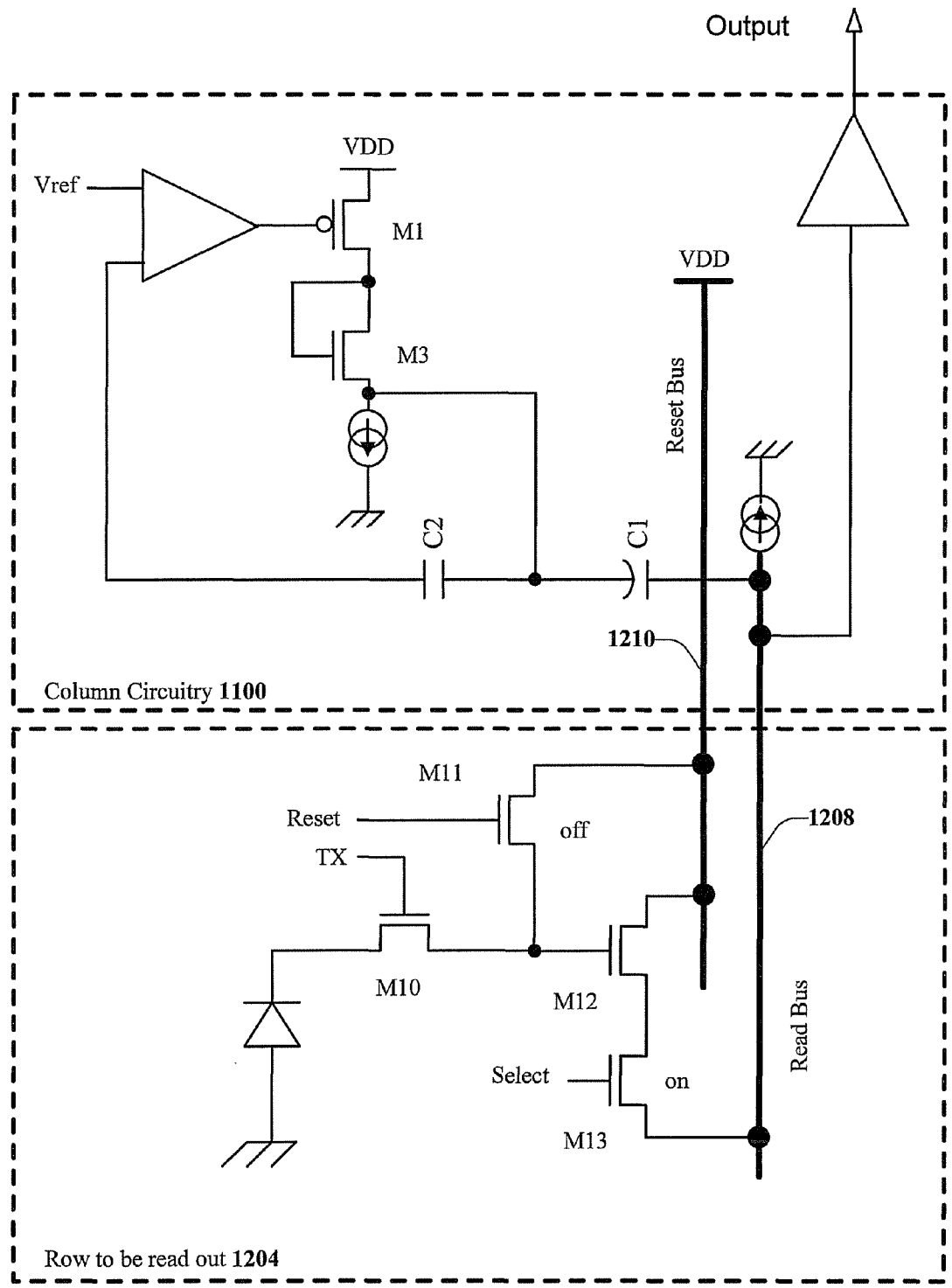
FIG. 18 illustrates the column circuitry of FIG. 12 when configured for sampling the reset level of the pixel, according to an aspect.

FIG. 18 illustrates the column circuitry 1100 of FIG. 12 when configured for sampling the reset level of the pixel at 802 in FIG. 8. Also illustrated is the row to be read out 1204. It corresponds to the period in FIG. 13 when S5, S8, S9, and S11 are high. Now C2 is back in the feedback loop, but is connected to the output of the level-shifting device M3. The Dummy Bias source (see FIG. 11) and M3 are intended to mimic the level shifting of the source follower M13. This does not need to be precise; it is intended to maintain the op-amp output voltage within a small range, such as the reference level phase of FIG. 15. Because of the feedback, the common node of C1 and C2 will be at Vref level shifted by the C2 voltage (and op-amp offset). At the other node of C1 is the read bus level, which corresponds to the pixel reset level. At the end of this period, C1 is disconnected.

In summary, C1 now has the information related to the reset level of the pixel in the row to be read out 1204. While the C1 voltage is offset by the voltage across C2, Vref, and the op-amp input-referred offset, it should be noted that these same components were present in the read bus level just before the pixel was reset, so they are cancelled. (This means that in FIG. 8, the actual reset bus level at 802 will vary from pixel-to-pixel, but this is cancelled.) Hence, C1 ends up with the read bus voltage change as a result of charge injection. Note that the op-amp load is primarily C1, which is generally a small fraction of the load of the reset bus. The op-amp output device M2 is shut off, leaving only M1, which can be sized appropriately for the op-amp frequency response. This can also save power, as the dummy bias current can be a small fraction of the pixel bias. Miller compensation is active, even in pass-thru mode (see Comp signal in Table 1 above). S8 turns off at the end of this period, and all the other switches turn off thereafter. The reset bus is connected to the power supply, as it is not part of the feedback loop.

Figure 19:
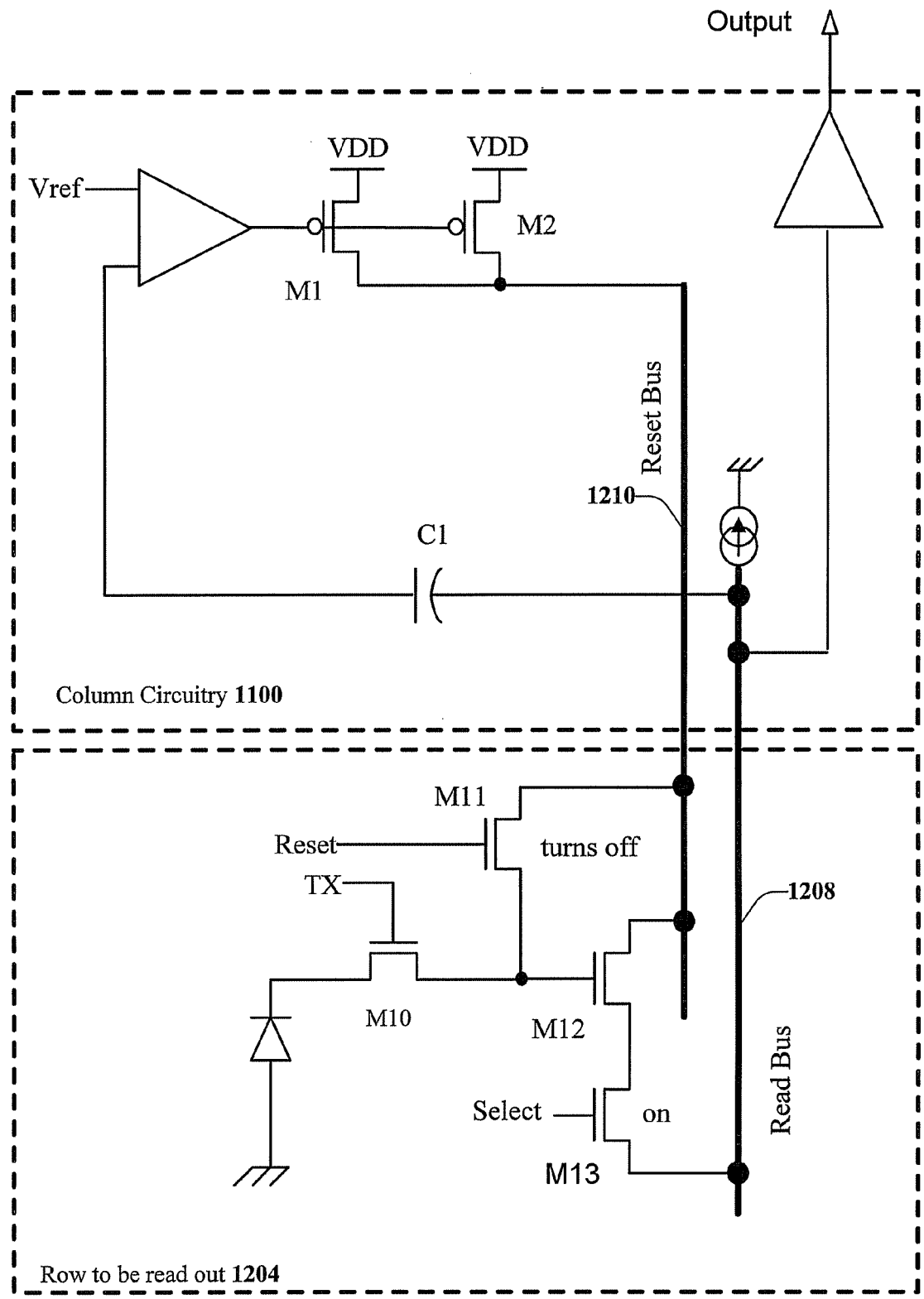
FIG. 19 illustrates the column circuitry of FIG. 12 when configured for adjusting the reset bus level based on the sampled reset level as shown in FIG. 8, according to an aspect.

FIG. 19 illustrates the column circuitry 1100 of FIG. 12 when configured for 806 in FIG. 8, adjusting the reset bus level based on the sampled reset level. The pixel is concurrently reset (second pulse in FIG. 8). Note that C1 has been re-connected, with a polarity opposite the polarity of FIG. 18. FIG. 19 corresponds to the period in FIG. 13 when S6 and S7 are high. The voltage on C1 is used to level shift the read bus level above Vref, perturbed by the input-referred offset of the op-amp. Then when M11 turns off, the read bus will settle to its target Vref (with op-amp offset). The pixel's own offset will be gone (or substantially gone), because (i) the charge injection has been cancelled by C1, and (ii) the source follower drop is annulled by the feedback.

Figure 20:
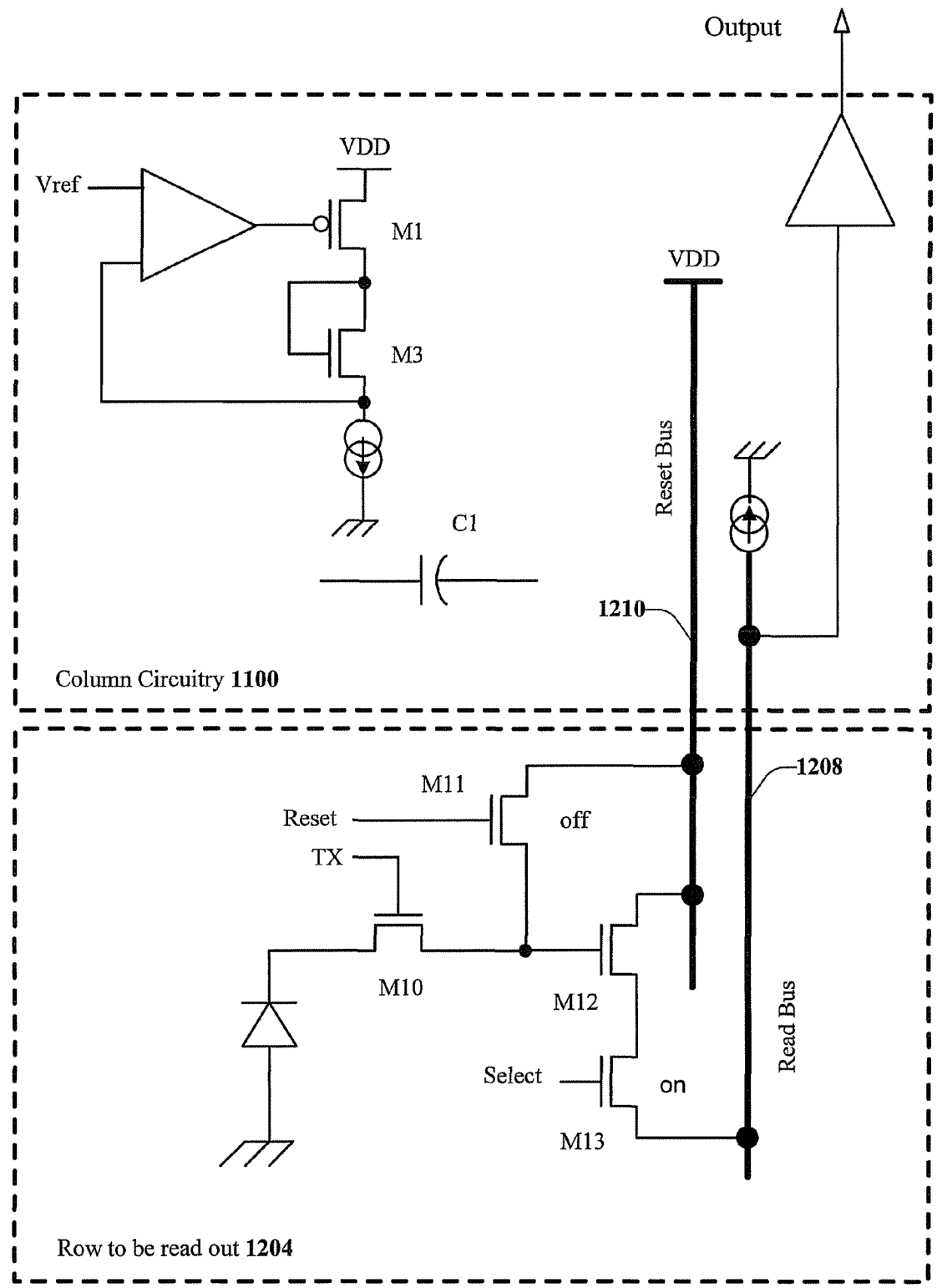
FIG. 20 illustrates the column circuitry of FIG. 12 shortly after the second reset event of FIG. 13, according to an aspect.

FIG. 20 illustrates the column circuitry 1100 of FIG. 12 shortly after the second reset event of FIG. 13. Capacitor C1 is disconnected, but only after the Reset line has gone low, in preparation for the next row. The reset bus is brought to the supply in preparation for 808 of FIG. 8.

S6 and S7 have turned off, disconnecting both sides C1, and the reset bus is re-connected to the power supply VDD. After the read bus settles, 808 of FIG. 8 can be performed: sampling of the reset level for readout. This sampling may be performed by circuitry either inside or immediately following the Subtraction & Gain block 1108 of FIG. 11, or by other means. It corresponds to the Sample Reset Level operation 1004 in FIG. 10. Recall from above that the reference sample and read bus sample (e.g., the final reset level) are both perturbed by the op-amp offset, so it cancels out. Also, the op-amp output is fed back through the level shifter M3, when S14 goes high. This keeps the op-amp from saturating, and it is independent of the sampling event. As with the period of FIG. 18, Miller compensation is enabled, and the reset bus is tied to the power supply. The select line is held high as long as needed for the read bus to settle and the sampling to occur.

Figure 21:
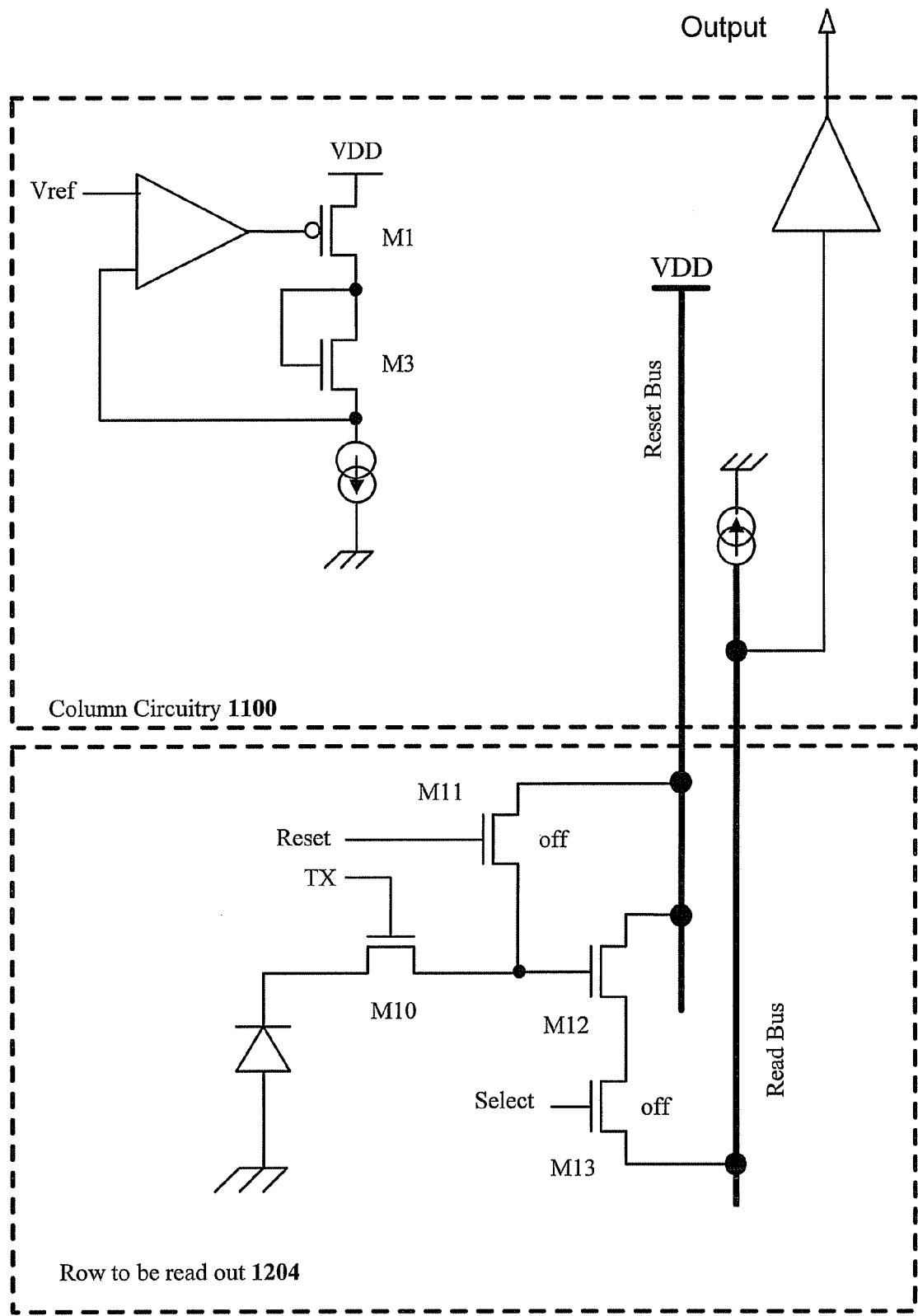
FIG. 21 shows the column circuitry of FIG. 12 during the period outside the fixed-pattern noise correction operation of FIG. 8 in accordance with an aspect.

FIG. 21 shows the column circuitry 1100 of FIG. 12 during the period outside the FPN correction operation of FIG. 8. The select line has gone low, but S14 is still high. The pixel readout is in its standard configuration, and the op-amp is in local feedback. The select line is low. After Select goes low but when S14 is still high. The op-amp output continues to be fed back, so it is not saturated when the next row starts.

As discussed above, FIG. 14 shows the timing for alternate rows. The timing of FIG. 13 is applicable for an arbitrary row in the readout sequence. However, the subsequent row needs the timing of FIG. 14, which is similar to FIG. 13, except that the roles of C1 and C2 are interchanged. From then on, the timing continues to alternate between the two. Recall from above that the FIG. 16 configuration relies on a voltage across C2 from the previous row, but the FIG. 20 configuration leaves a charge on C1 corresponding to what was needed for C2. Hence, the subsequent row will rely on C1, which has been properly prepared.

Figure 22:
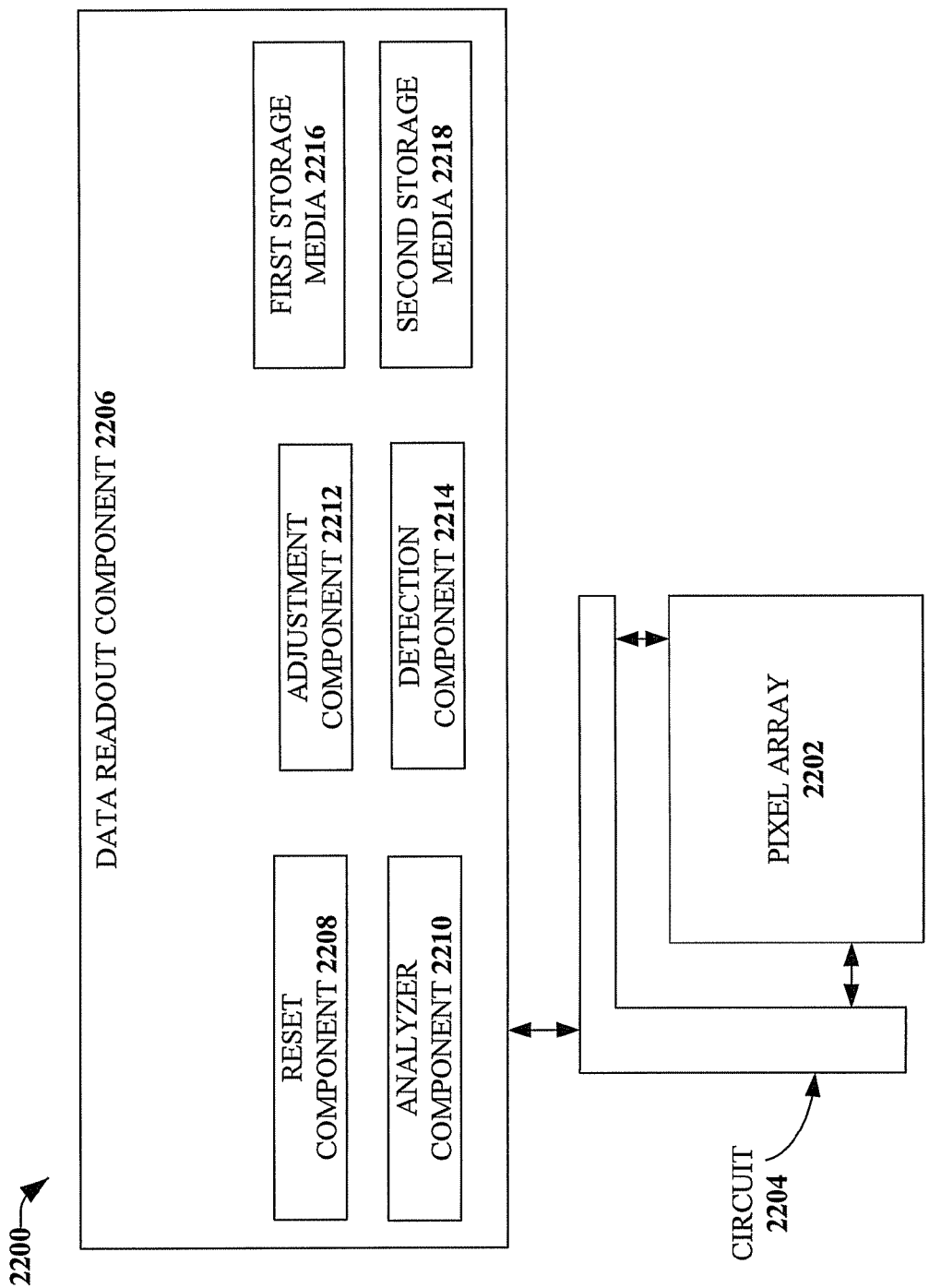
FIG. 22 illustrates a high-level block diagram of an example system that can be configured to provide front-end pixel fixed pattern noise correction in imaging arrays having wide dynamic range, according to one or more aspects of the subject disclosure.

FIG. 22 illustrates a high-level block diagram of an example system 2200 that can be configured to provide front-end pixel fixed pattern noise correction in imaging arrays having wide dynamic range, according to one or more aspects of the subject disclosure. System 2200 can comprise a pixel array 2202. Pixel array 2202 can be configured for receiving optical information and producing an electrical output that is proportional in magnitude to received optical energy. In addition, pixel array 2202 is electrically connected to a circuit 2204 that can be configured to receive the electrical charge from the pixel array 2202, and output the electrical charge in response to an output clock pulse. In accordance with some aspects, the pixel array 2202 comprises a five transistor pixel.

A data readout component 2206 can be employed for managing circuit 2204 by controlling suitable data transfer and data reset clocks operative to control data readout and transfer operations, and data reset operations of circuit 2204. According to one aspect of the subject disclosure, data readout component 2206 can comprise a reset component 2208 configured to reset a pixel of the pixel array.

Also included in data readout component 2206 is an analyzer component 2210 configured to sample a reset level of a pixel included in the pixel array 2202. Also included in data readout component 2206 is an adjustment component 2212 that is configured to adjust a reset bus in response to the sampled reset level. For example, adjustment to the reset bus facilitates correction of fixed pattern noise, as disclosed herein. In accordance with some aspects, the adjustment component 2212 is a switched capacitor block.

In accordance with some aspects, the adjustment component 2212 is further configured to adjust a power supply level on the reset bus in response to a result of the sampled reset level. In some aspects, the adjustment component 2212 is configured to adjust the reset bus a second time in response to the sampled signal level.

A detection component 2214, included in data readout component 2206, is configured to sample a signal level of the pixel for external readout from the pixel array. In some aspects, the data readout component 2206 is configured to readout an image from the array.

In accordance with some aspects, the adjustment component 2212 is further configured to subtract a sampled reference level from the sampled reset level and apply gain at a column level.

In some aspects, data readout component 2206 can include a first storage media 2216 and a second storage media 2218. Although shown as internal to data readout component 2206, in accordance with some aspects, either or both the first storage media 2216 and the second storage media 2218 can be external to data readout component 2206. First storage media 2216 is configured to retain the reset level and second storage media 2218 is configured to retain the signal level. The retained reset level and the retained signal level comprise a fixed-pattern noise map.

Figure 23:
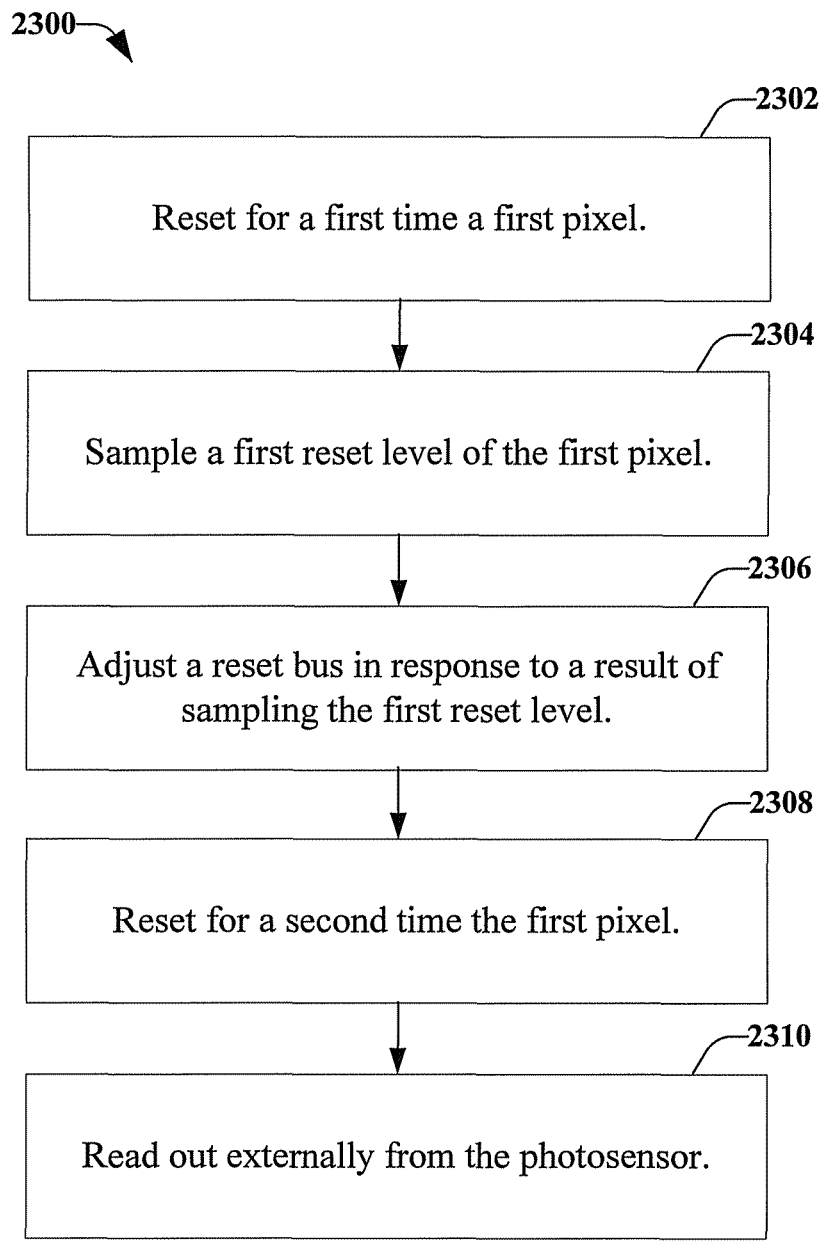
FIG. 23 illustrates an example method for discrete time and feed forward correction of fixed pattern noise in a pixel array, according to an aspect.

FIG. 23 illustrates an example method 2300 for discrete time and feed forward correction of fixed pattern noise in a pixel array, according to an aspect. Method 2300 starts, at 2302, when a photosensor of a first pixel in a first row of an array is reset for a first time. In an aspect, the array comprises a plurality of pixels arranged in rows and columns.

At 2304, a first reset level of the first pixel is sampled and a reset bus is adjusted, at 2306. The adjustment to the reset bus is in response to a result of sampling the first reset level. At 2308, the photosensor of the first pixel is reset for a second time. Method 2300 continues, at 2310 with reading out externally from the photosensor.

In accordance with some aspects, resetting the photosensor for a second time comprises performing a feed-forward adjustment. In an aspect, performing the feed-forward adjustment comprises compensating for a pixel offset. In accordance with some aspects, resetting the photosensor the second time comprises removing fixed-pattern noise.

Figure 24:
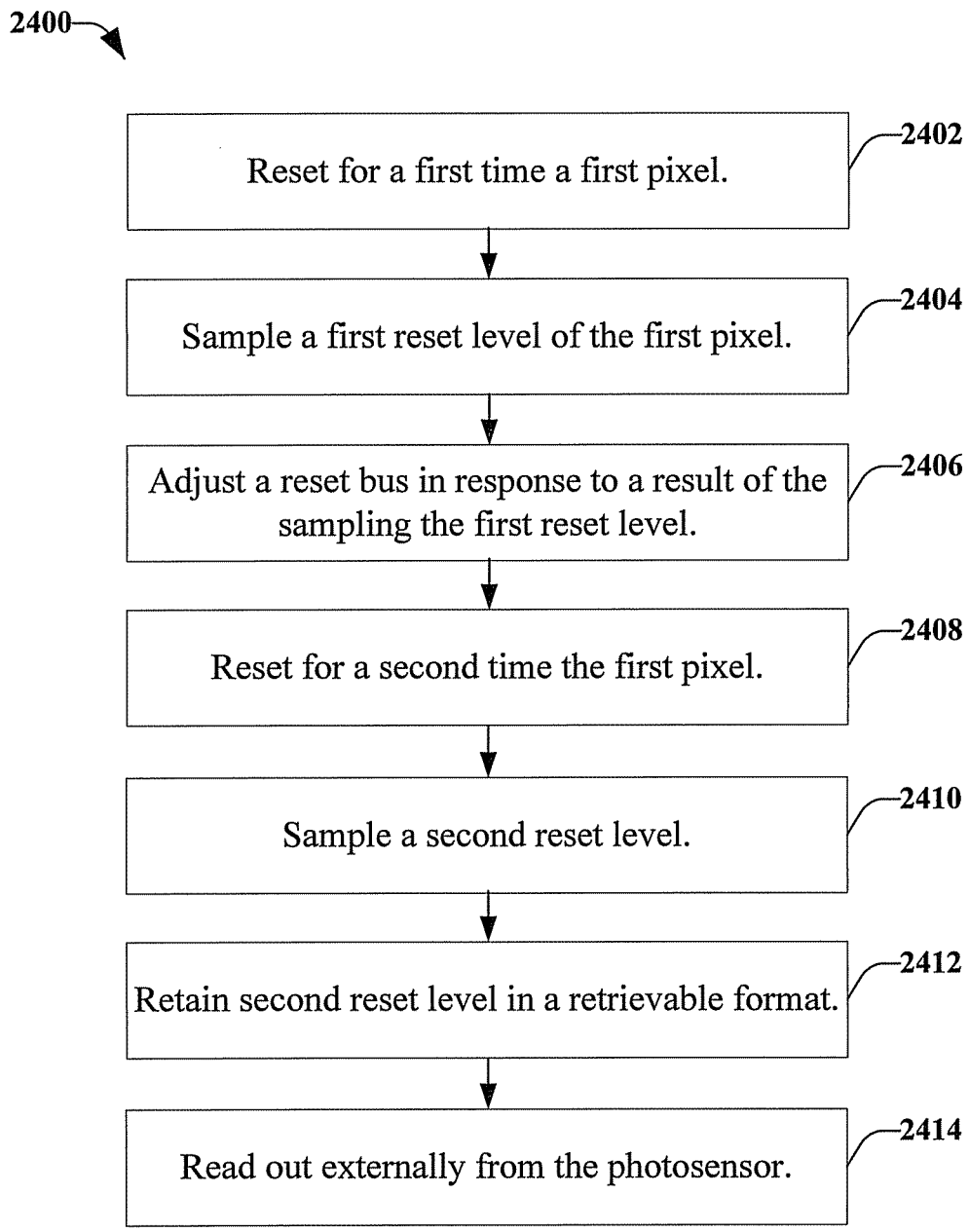
FIG. 24 illustrates an example method for front-end pixel fixed pattern noise correction, according to an aspect.

FIG. 24 illustrates an example method 2400 for front-end pixel fixed pattern noise correction, according to an aspect. At 2402, a first pixel is reset for a first time and, at 2404, a first reset level of the first pixel is sampled. As a function of a result of the sampling, at 2404, a reset bus is adjusted, at 2406. In an example, the adjustment can include adjusting a power supply level on the reset bus in response to a result of the sampled reset level.

At 2408, the first pixel is reset a second time. A second reset level is sampled, at 2410 and the second reset level is retained, at 2412, in a retrievable format. In an example, the retained second reset level can be utilized for correlated double sampling. In another example, the method can include capturing residual fixed-pattern noise based on the retained second reset level. Method 2400 continues, at 2414, by reading out externally from the photosensor.

Figure 25:
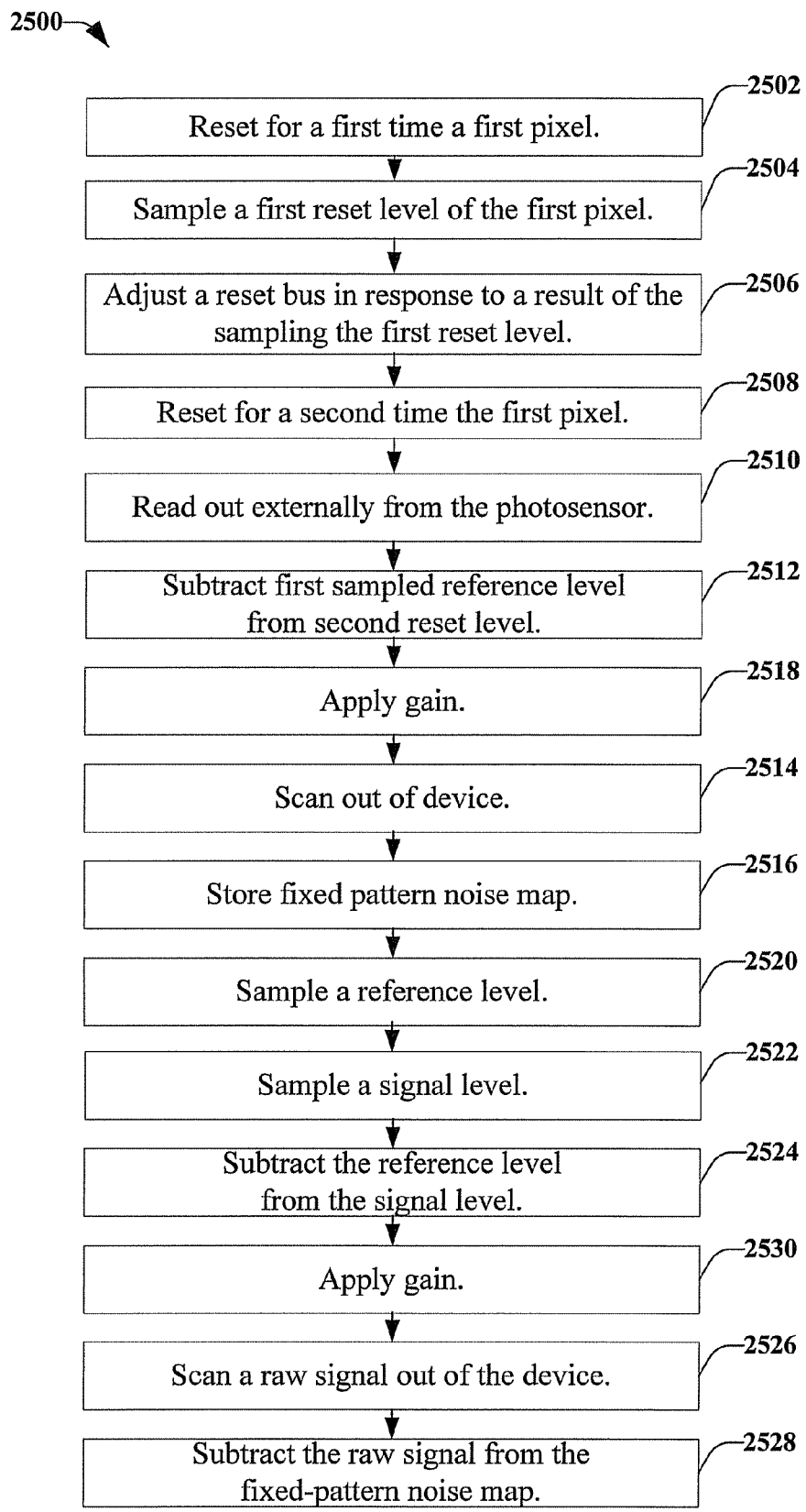
FIG. 25 illustrates another example method, according to an aspect.

FIG. 25 illustrates another example method 2500, according to an aspect. Method 2500 includes resetting a first pixel for a first time, at 2502, and sampling a first reset level of the first pixel, at 2504. A reset bus is adjusted, at 2506, in response to a result of sampling the first reset level. At 2508, the first pixel is reset a second time and external read out from the photosensor occurs, at 2510.

At 2512, the first sampled reference level is subtracted from a second reset level and scanning out of the device is performed, at 2514. A fixed-pattern noise map is stored, at 2516. In accordance with some aspects, gain is applied, at 2518, before scanning out of the device, at 2514.

In accordance with some aspects, method 2500 includes, after integration, sampling a reference level, at 2520 and sampling a signal level, at 2522. The reference level is subtracted from the signal level, at 2524. A raw signal is scanned out of the device, at 2526. The raw signal is subtracted from the fixed-pattern noise map, at 2528, to obtain a clean signal. According to some aspects, gain is applied, at 2530, after subtracting the reference level from the signal level.

As disclosed herein, aspects relate to a CMOS circuit and system that provide quality performance and front-end pixel fixed-pattern noise (FPN) correction in imaging arrays having wide dynamic range. The CMOS circuit and system can be utilized with sensor arrays comprising various pixels. For example, the disclosed aspects can be utilized with a 4T pixel cell, a 5T pixel cell, a 6T pixel cell, a 7T pixel cell, and so forth.

Various aspects provide a self-contained analog circuit for front-end pixel FPN correction for global reset arrays. A discrete time and feed forward correction of FPN in a pixel array is also provided. Further, the disclosed aspects utilize self-contained feed-forward correction as part of a discrete-time feedback system. The disclosed aspects are speed limited only by the bandwidth of the pixel readout loop (e.g., the pixel and its read bus).

Exemplary Operating Environment

Figure 26:
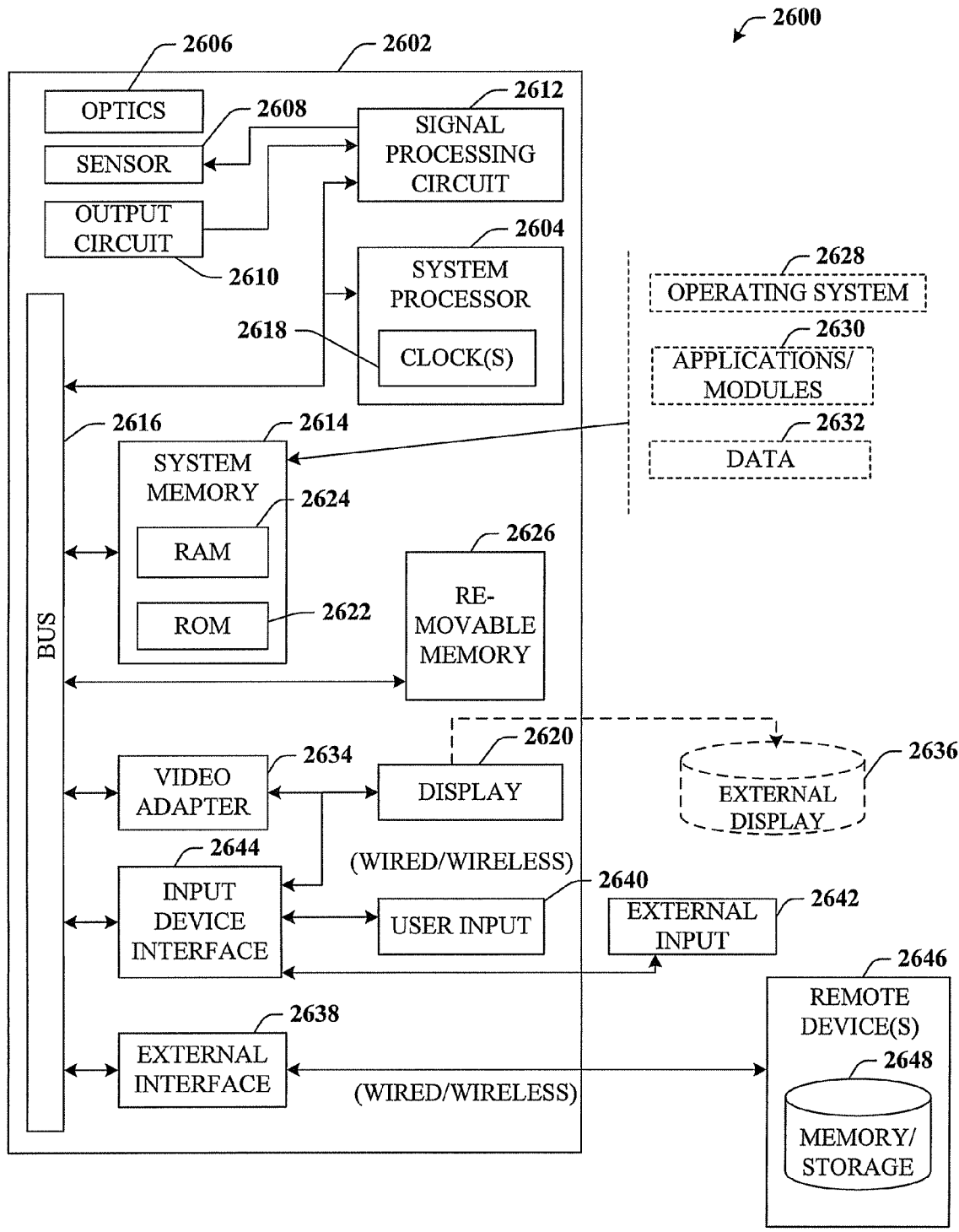
FIG. 26 illustrates a block diagram of an exemplary digital camera system operable to execute the disclosed architecture.

Referring now to FIG. 26, illustrated is a block diagram of an exemplary digital camera system operable to execute the disclosed architecture. In order to provide additional context for various aspects of the various embodiments, FIG. 26 and the following discussion are intended to provide a brief, general description of a suitable electronic computing environment 2600 in which the various aspects of the various embodiments can be implemented. Additionally, while the various embodiments described above may be suitable for application in the general context of instructions that may run or be executed in conjunction with an electronic device, those skilled in the art will recognize that the various embodiments also can be implemented in combination with other program modules and/or as a combination of hardware and software.

Generally, program modules include routines, programs, components, data structures, etc., that perform particular tasks associated with electronic computing environment 2600. Moreover, those skilled in the art will appreciate that the disclosed aspects can be practiced with other electronic system configurations, including hand-held computing devices, microprocessor-based or programmable consumer electronics, single-processor or multiprocessor state machines, minicomputers, as well as personal computers, and the like, each of which can be operatively coupled to one or more associated devices.

The illustrated aspects of the various embodiments may also be practiced in distributed computing environments where certain tasks are performed by remote processing devices that are linked through a wired or wireless communications network. In a distributed computing environment, program modules can be located in both local and remote memory storage devices.

An electronic processing device typically includes a variety of computer-readable media. Computer-readable media can be any available media that can be accessed by the electronic processing device and includes both volatile and non-volatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, or any other medium which can be used to store the desired information and which can be accessed by the electronic processing device.

Continuing to reference FIG. 26, the exemplary electronic processing environment 2600 for implementing various aspects of one or more of the various embodiments includes a digital camera 2602, the digital camera 2602 includes a system processor 2604, optics 2606, an image sensor 2608, an output circuit 2610, a signal processing circuit 2612, a system memory 2614 and a system bus 2616. The system bus 2616 couples to system components including, but not limited to, the system memory 2614 to the system processor 2604. The system processor 2604 can be a suitable semiconductor processing device manufactured for digital camera 2602, or any of various commercially available processors. Dual microprocessors and other multi-processor architectures may also be employed as the system processor 2604.

Optics 2606 can comprise one or more lens elements comprised of refractive material. The refractive material can be suitable to refract electromagnetic radiation, particularly in the visible spectrum, but also the near infrared or ultraviolet spectra, or other suitable spectra. Particularly, optics 2606 can be configured to project and focus an image of an object onto image sensor 2608. Optics can also be configured with an actuator (not depicted) to mechanically adjust optics 2606 to focus objects at varying distances from digital camera 2602.

Image sensor 2608 can comprise any of various sensors for receiving electromagnetic radiation and generating electric signals proportionate to a magnitude of the electromagnetic radiation. For instance, image sensor 2608 can comprise a video tube, a charge-coupled device, or a CMOS device, or the like, or an array of such devices. In a particular example, image sensor 2608 can comprise an array of photodetectors. Electric signals generated by image sensor 2608 can be transferred to output circuit 2610, in response to a clock signal generated by an electronic clock(s) 2618 managed by system processor 2604. The electric signals can then be output to signal processing circuit 2612 for image processing.

Signal processing circuit 2612 can be any suitable hardware or software processing entity, including an integrated circuit(s), an application specific integrated circuit(s) (ASIC), a state machine, or other suitable signal processing device. Signal processing circuit 2612 can be configured to perform operations on electric signals provided by output circuit 2610.

These operations can include correlated double sampling, gamma processing, analog to digital conversion, gain adjustment, interpolation, compression, or a combination thereof of the like, to generate digital data to be adapted for presentation on an electronic display 2620 of digital camera 2602. Additionally, signal processing circuit 2612 can store the digital data in system memory 2614 before, during and after the operations.

The system bus 2616 can be any of several types of bus structure suitable for communicatively connecting components of digital camera 2602. System bus 2616 can further interconnect to a memory bus (with or without a memory controller), a peripheral bus, and a local bus using any of a variety of commercially available bus architectures. The system memory 2614 can include read-only memory (ROM) 2622 and random access memory (RAM) 2624. A basic input/output system (BIOS) for digital camera 2602 can be stored in a non-volatile memory such as ROM, EPROM, EEPROM, which BIOS contains the basic routines that help to transfer information between elements within the digital camera 2602, when powered on for instance. The RAM 2624 can include a high-speed RAM such as static RAM for caching data. Furthermore, digital camera can include removable memory 2626, which can include any suitable non-volatile memory (e.g., Flash memory), or other removable memory technology.

A number of program modules can be stored in the system memory 2614, including an operating system 2628, one or more application programs or program modules 2630 and program data 2632. All or portions of the operating system, applications, modules, and/or data can also be cached in the RAM 2624. It is appreciated that the various embodiments can be implemented with various commercially available or proprietary operating systems or combinations of operating systems.

The display 2620 is connected to the system bus 2616 via an interface, such as a video adapter 2634. Display 2620 can comprise a flat panel display, such as a liquid crystal display, a light-emitting diode display, or the like. System processor 2604 can control output of image data to present a digital replica of the image received by image sensor 2608 on display 2620. In addition, digital camera 2602 can output the image data to an external display 2636 via a suitable external interface 2638.

A user can enter commands and information (e.g., user input 2640) and/or other external input 2642 can be entered into the digital camera 2602 through one or more input devices, e.g., touch screen buttons, switches, dials, levers, etc. For instance, zoom functionality is often implemented by pressing a button, dial, lever, etc., in one direction to zoom in, or another direction to zoom out. Further, display options, selection of images, and similar display commands can be input via a touch screen, often implemented as part of display 2620. Other input devices (not shown) may include a microphone, an IR remote control, a joystick, a game pad, a stylus pen, or the like. These and other input devices are often connected to the system processor 2604 through an input device interface 2644 that is coupled to the system bus 2616, but can be connected by other interfaces, such as a parallel port, an IEEE1394 serial port, a game port, a USB port, an IR interface, a Bluetooth interface, etc.

The external interface 2638 can include at least one or both of Universal Serial Bus (USB) and IEEE1394 interface technologies. Other external connection technologies are within contemplation of the subject matter claimed herein. Moreover, external interface 2638 can include a wireless technology, such as a Wi-Fi communication technology, Bluetooth™ technology, infrared (IR) technology, cellular technology, or the like. In addition to an external display, external interface 2638 can facilitate communicatively coupling digital camera 2602 to one or more remote devices 2646. Remote device(s) 2646 can include a computer, a display, a memory or storage device 2648, and so on. Moreover, commands can be given to digital camera 2602 from remote device(s) 2642 over external interface 2638 to system processor 2604. This can facilitate remote control of digital camera 2602, for remote camera operation (e.g., taking pictures, adding or deleting pictures from system memory 2614, etc.), transferring data, such as stored digital images, updating operation system 2628, applications/program modules 2630, or data 2632, and so on.

The digital camera 2602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, and so forth), and telephone. This includes at least Wi-Fi and Bluetooth wireless technologies. Thus, the communication can be a predefined structure as with a conventional network or simply an ad hoc communication between at least two devices.

Wi-Fi, or Wireless Fidelity, allows connection to the Internet from various locations within range of a WiFi access point, without wires. Wi-Fi is a wireless technology similar to that used in a cell phone that enables such devices, e.g., computers, to send and receive data indoors and out; within the range of the access point. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and dire Rambus RAM (DRRAM). Additionally, the disclosed memory components of systems or methods herein are intended to comprise, without being limited to comprising, these and any other suitable types of memory.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the one or more aspects. It is, of course, not possible to describe every conceivable combination of components or methods for purposes of describing the aspects, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

As used in this application, the terms "component," "system," and the like are intended to refer to a computer-related entity or an entity related to an operational apparatus with one or more specific functionalities, wherein the entity can be either hardware, a combination of hardware and software. As an example, a component may be, but is not limited to being, a process running on a processor, a processor, and/or a computer. By way of illustration, both an application running on a server or network controller, and the server or network controller can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software, or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. As further yet another example, interface(s) can include input/output (I/O) components as well as associated processor, application, or Application Programming Interface (API) components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What is claimed is:

1. A system for discrete time and feed forward correction of fixed pattern noise in a pixel array, comprising:
    a reset component configured to reset a pixel of the pixel array, the pixel comprising a photodiode having a signal output switchably connected to a floating diffusion node and comprising a reset transistor configured to switchably connect the floating diffusion node to a reset bus;
    an analyzer component configured to sample a reset level of the pixel;
    an adjustment component configured to receive a result of the sampled reset level and comprising a circuit to provide a feedback or a feed-forward adjustment to a power supply level on the reset bus in response to the result of the sampled reset level, wherein the feedback or the feed-forward adjustment to the reset bus facilitates correction of the fixed pattern noise; and a detection component configured to sample a signal level of the pixel for external readout from the pixel array.

2. The system of claim 1, wherein the circuit to provide the feedback or the feed-forward adjustment is a switched capacitor block, and wherein a read bus is connected to the switched capacitor block and column circuitry for readout.

3. The system of claim 1, wherein the reset component is configured to reset the pixel of the pixel array a second time.

4. The system of claim 1, further comprising a data readout component configured to readout an image from the pixel array.

5. The system of claim 1, wherein the adjustment component is further configured to subtract a sampled reference level from the sampled reset level and apply gain at a column level.

6. The system of claim 1, further comprising:
a first storage media configured to retain the reset level; and
a second storage media configured to retain the signal level, wherein the retained reset level and the retained signal level comprise a fixed-pattern noise map.

7. The system of claim 1, wherein the pixel array comprises a five transistor pixel.

8. The system of claim 1, further comprising:
a pixel source follower device; and
a select device, wherein the pixel source follower device, the select device, and the pixel comprise a feedback loop with an op-amp.

9. A method of operating a photosensor, comprising:
resetting for a first time the photosensor of a first pixel in a first row of an array, the first pixel comprising a photodiode having a signal output switchably connected to a floating diffusion node and comprising a reset transistor configured to switchably connect the floating diffusion node to a reset bus;
sampling a first reset level of the first pixel;
generating a feedback signal at least in part from a result of the sampling the first reset level;
providing the feedback signal to the reset bus for adjusting a characteristic of the reset bus;
resetting the photosensor of the first pixel a second time; and
reading out externally from the photosensor, wherein the array comprises a plurality of pixels arranged in rows and columns.

10. The method of claim 9, wherein the resetting the photosensor of the first pixel the second time comprises performing a feed-forward adjustment.

11. The method of claim 10, wherein the performing the feed-forward adjustment comprises compensating for a pixel offset.

12. The method of claim 9, wherein the resetting the photosensor of the first pixel the second time comprises removing fixed-pattern noise.

13. The method of claim 9, further comprising:
sampling a second reset level after the resetting for the second time; and
retaining the second reset level in a retrievable format.

14. The method of claim 13, further comprising:
utilizing the retained second reset level for correlated double sampling.

15. The method of claim 13, further comprises capturing residual fixed-pattern noise based on the retained second reset level.

16. The method of claim 9, further comprising:
subtracting a first reference level from a second reset level;
scanning out of a device; and
storing a fixed-pattern noise map.

17. The method of claim 16, further comprises applying gain before the scanning out of the device.

18. The method of claim 16, further comprising:
after integration, sampling a reference level;
sampling a signal level;
subtracting the reference level from the signal level;
scanning a raw signal out of the device; and
subtracting the raw signal from the fixed-pattern noise map to obtain a clean signal.

19. The method of claim 18, further comprises applying gain after the subtracting the reference level from the signal level.

20. A pixel-reset system, comprising:
means for resetting a photosensor of a first pixel in a first row of an array, the first pixel comprising a photodiode having a signal output switchably connected to a floating diffusion node and comprising a reset transistor configured to switchably connect the floating diffusion node to a reset bus;
means for measuring a first reset level of the first pixel;
means for generating a correction signal in response to the first reset level;
means for providing the correction signal for altering a power supply level on the reset bus;
means for performing a feed-forward adjustment of the photosensor of the first pixel to substantially remove fixed-pattern noise; and
means for reading out externally from the photosensor, wherein the array comprises a plurality of pixels arranged in rows and columns.

* * * * *